United States Patent
Takahashi et al.

(10) Patent No.: US 10,251,138 B2
(45) Date of Patent: Apr. 2, 2019

(54) USER APPARATUS, MOBILE COMMUNICATION SYSTEM, AND MAXIMUM TRANSMISSION POWER DETERMINATION METHOD

(71) Applicant: NTT DOCOMO, INC., Tokyo (JP)

(72) Inventors: Hideaki Takahashi, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/306,294

(22) PCT Filed: Oct. 6, 2015

(86) PCT No.: PCT/JP2015/078360
§ 371 (c)(1),
(2) Date: Oct. 24, 2016

(87) PCT Pub. No.: WO2016/056556
PCT Pub. Date: Apr. 14, 2016

(65) Prior Publication Data
US 2017/0048809 A1      Feb. 16, 2017

(30) Foreign Application Priority Data

Oct. 7, 2014 (JP) .................................. 2014-206231
May 28, 2015 (JP) .................................. 2015-109145

(51) Int. Cl.
*H04W 52/54* (2009.01)
*H04W 52/34* (2009.01)
(Continued)

(52) U.S. Cl.
CPC ........... *H04W 52/54* (2013.01); *H04W 48/12* (2013.01); *H04W 52/346* (2013.01);
(Continued)

(58) Field of Classification Search
CPC ... H04W 48/12; H04W 48/20; H04W 52/281; H04W 52/346; H04W 52/36;
(Continued)

(56) References Cited

U.S. PATENT DOCUMENTS 8,285,286 B2 * 10/2012 Lee ..................... H04W 74/004
370/252
8,914,058 B2 * 12/2014 Seo ....................... H04W 52/32
455/522
(Continued)

FOREIGN PATENT DOCUMENTS

JP        2014132796 A     7/2014
JP        2014150555 A     8/2014
(Continued)

OTHER PUBLICATIONS

Office Action issued in corresponding Japanese Application No. 2016-553120, dated Nov. 28, 2017 (10 pages).
(Continued)

*Primary Examiner* — Jean A Gelin
(74) *Attorney, Agent, or Firm* — Osha Liang LLP

(57) ABSTRACT

A user apparatus in a mobile communication system including a base station and the user apparatus, including: reception means configured to receive, from the base station, first system information including a first maximum transmission power value and a second maximum transmission power value, and second system information including a first signaling value and a second signaling value; and control means configured, when determining that the second signaling value included in the second system information is a value defined as a transmission condition in a cell where the user apparatus resides, to determine the second maximum
(Continued)

Table 6.2.4-1: Additional Maximum Power Reduction (A-MPR)

| Network Signalling value | Requirements (subclause) | E-UTRA Band | Channel bandwidth (MHz) | Resources Blocks ($N_{RB}$) | A-MPR (dB) |
|---|---|---|---|---|---|
| NS_01 | 6.6.2.1.1 | Table 5.5-1 | 1.4, 3, 5, 10, 15, 20 | Table 5.6-1 | N/A |
| NS_05 | 6.6.3.3.1 | 1 | 10,15,20 | ≥ 50 | ≤ 1 |
| NS_07 | 6.6.2.2.3 6.6.3.3.2 | 13 | 10 | Table 6.2.4-2 | |
| NS_17 | 6.6.3.3.10 | 28 | 5, 10 | Table 5.6-1 | N/A | transmission power value corresponding to the second signaling value as a maximum transmission power value for use in the cell.

11 Claims, 26 Drawing Sheets

(51) Int. Cl.
| | |
|---|---|
| *H04W 52/36* | (2009.01) |
| *H04W 48/12* | (2009.01) |
| *H04W 52/40* | (2009.01) |
| *H04W 84/04* | (2009.01) |
| *H04W 48/20* | (2009.01) |
| *H04W 52/28* | (2009.01) |

(52) U.S. Cl.
 CPC ......... *H04W 52/36* (2013.01); *H04W 52/367* (2013.01); *H04W 52/40* (2013.01); *H04W 48/20* (2013.01); *H04W 52/281* (2013.01); *H04W 84/042* (2013.01)

(58) Field of Classification Search
 CPC ... H04W 52/367; H04W 52/40; H04W 52/54; H04W 84/042
 USPC .............................. 455/414.1, 512, 513, 522
 See application file for complete search history.

(56) References Cited

U.S. PATENT DOCUMENTS

| | | | | |
|---|---|---|---|---|
| 2009/0088083 | A1* | 4/2009 | Fujii | H04W 52/242 455/69 |
| 2011/0216732 | A1* | 9/2011 | Maeda | H04W 4/08 370/329 |
| 2012/0044870 | A1 | 2/2012 | Mochizuki et al. | |
| 2012/0322446 | A1* | 12/2012 | Ramachandran | H04W 48/18 455/436 |
| 2013/0003680 | A1* | 1/2013 | Yamamoto | G01S 5/0205 370/329 |
| 2013/0010635 | A1* | 1/2013 | Seo | H04W 52/143 370/252 |
| 2013/0039289 | A1* | 2/2013 | Lee | H04W 52/367 370/329 |
| 2013/0053103 | A1* | 2/2013 | Kim | H04L 5/003 455/561 |
| 2013/0195073 | A1* | 8/2013 | Chen | H04L 5/0023 370/331 |
| 2013/0322305 | A1* | 12/2013 | Lu | H04L 5/14 370/280 |
| 2014/0016598 | A1* | 1/2014 | Kwon | H04L 5/0023 370/329 |
| 2014/0086173 | A1* | 3/2014 | Sadeghi | H04L 5/005 370/329 |
| 2014/0086195 | A1* | 3/2014 | Jung | H04W 52/367 370/329 |
| 2014/0113645 | A1* | 4/2014 | Sagae | H04W 52/146 455/452.1 |
| 2015/0009922 | A1* | 1/2015 | Hoshino | H04L 5/0053 370/329 |
| 2015/0038158 | A1* | 2/2015 | Kim | H04W 52/365 455/452.1 |
| 2015/0117376 | A1 | 4/2015 | Mochizuki et al. | |
| 2016/0174237 | A1* | 6/2016 | Zhao | H04W 74/0833 370/329 |
| 2016/0198392 | A1 | 7/2016 | Mochizuki et al. | |
| 2016/0286375 | A1* | 9/2016 | Fujishiro | H04W 52/383 |
| 2017/0272218 | A1 | 9/2017 | Mochizuki et al. | |
| 2017/0318548 | A1* | 11/2017 | Kim | H04W 72/0413 |

FOREIGN PATENT DOCUMENTS

| | | |
|---|---|---|
| WO | 2011/055909 A2 | 5/2011 |
| WO | 2013048198 A1 | 4/2013 |

OTHER PUBLICATIONS

International Search Report issued in PCT/JP2015/078360, dated Dec. 22, 2015 (2 page).
Written Opinion of the International Searching Authority issued in PCT/JP2015/078360, dated Dec. 22, 2015 (6 pages).
Nokia Networks; "Analysis of impacts of RAN4 LS on NS value handling"; 3GPP TSG-RAN WG2 Meeting #90, R2-152311; Fukuoka, Japan; May 25-29, 2015 (7 pages).
3GPP TS 36.101 V12.4.0; "3rd Generation Partnership Project; Technical Specification Group Radio Access Network; Evolved Universal Terrestrial Radio Access (E-UTRA); User Equipment (UE) radio transmission and reception (Release 12)"; Jun. 2014 (531 pages).
3GPP TS 36.331 V12.2.0; "3rd Generation Partnership Project; Technical Specification Group Radio Access Network; Evolved Universal Terrestrial Radio Access (E-UTRA); Radio Resource Control (RRC); Protocol Specification (Release 12)"; Jun. 2014 (366 pages).
3GPP TS 36.331 V10.14.0; "3rd Generation Partnership Project; Technical Specification Group Radio Access Network; Evolved Universal Terrestrial Radio Access (E-UTRA); Radio Resource Control (RRC); Protocol Specification (Release 10)"; Sep. 2014 (312 pages).
Extended European Search Report issued in the counterpart European Patent Application No. 15849592.9, dated Aug. 7, 2017 (9 pages).
Office Action issued in the counterpart Japanese Patent Application No. 2016-553120, dated Jun. 13, 2017 (11 pages).
Office Action issued in the counterpart European Patent Application No. 15849592.9, dated Aug. 9, 2018 (8 pages).
Samsung; "Enhancement of additional emission requirement handling"; 3GPP TSG RAN WG4 #60bis R4-115256; Zhuhai, China, Nov. 14-18, 2011 (3 pages).

\* cited by examiner

FIG.1

Table 6.2.4-1: Additional Maximum Power Reduction (A-MPR)

| Network Signalling value | Requirements (subclause) | E-UTRA Band | Channel bandwidth (MHz) | Resources Blocks ($N_{RB}$) | A-MPR (dB) |
|---|---|---|---|---|---|
| NS_01 | 6.6.2.1.1 | Table 5.5-1 | 1.4, 3, 5, 10, 15, 20 | Table 5.6-1 | N/A |
| NS_05 | 6.6.3.3.1 | 1 | 10, 15, 20 | $\geq 50$ | $\leq 1$ |
| NS_07 | 6.6.2.2.3 6.6.3.3.2 | 13 | 10 | Table 6.2.4-2 | |
| NS_17 | 6.6.3.3.10 | 28 | 5, 10 | Table 5.6-1 | N/A |

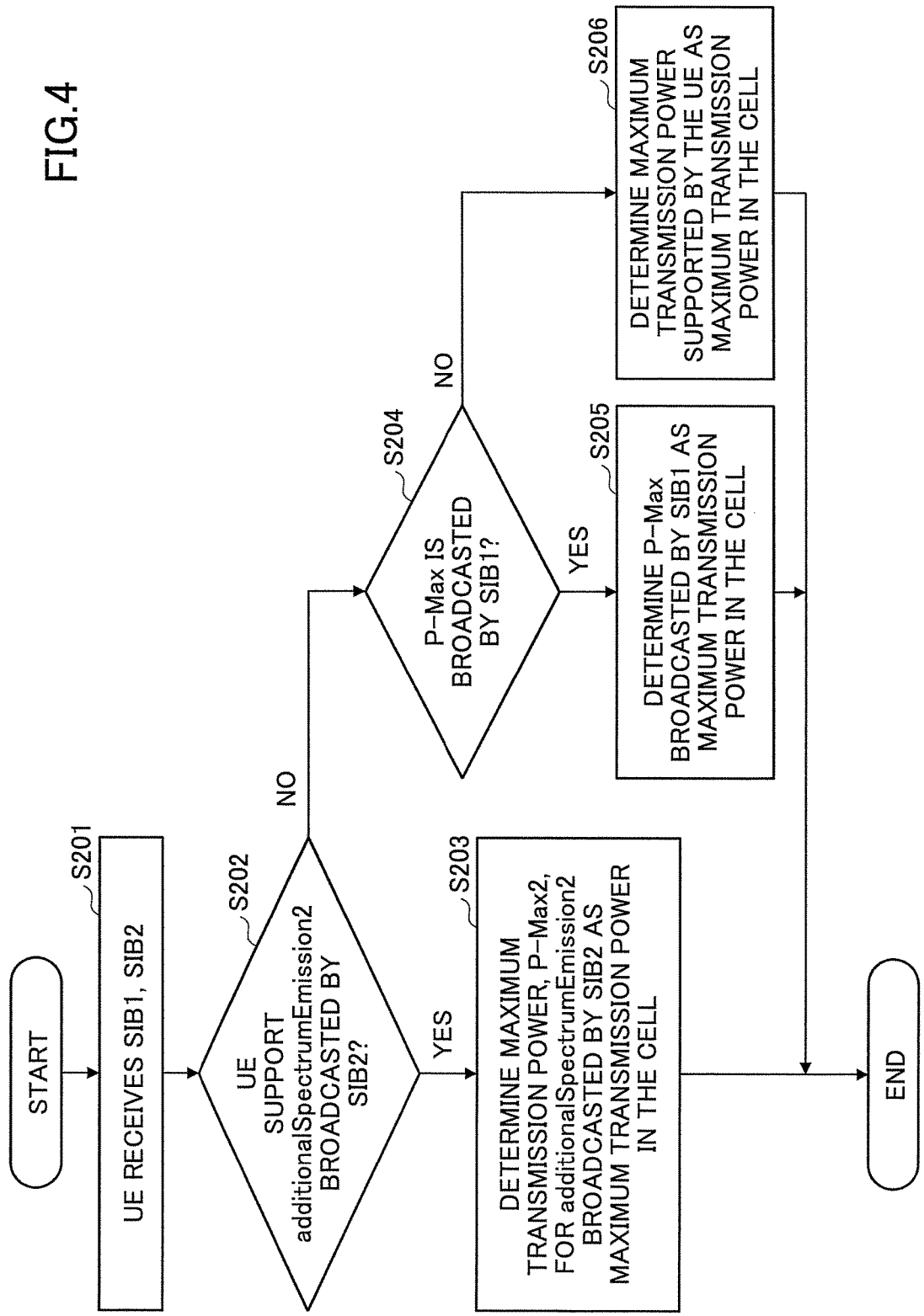

SystemInformationBlockType1 message

```
-- ASN1START
SystemInformationBlockType1 ::=      SEQUENCE {
    cellAccessRelatedInfo                SEQUENCE {
        plmn-IdentityList                    PLMN-IdentityList,
        trackingAreaCode                     TrackingAreaCode,
        cellIdentity                         CellIdentity,
        cellBarred                           ENUMERATED {barred, notBarred},
        intraFreqReselection                 ENUMERATED {allowed, notAllowed},
        csg-Indication                       BOOLEAN,
        csg-Identity                         CSG-Identity              OPTIONAL      -- Need OR
    },
    cellSelectionInfo                    SEQUENCE {
        q-RxLevMin                           Q-RxLevMin,
        q-RxLevMinOffset                     INTEGER (1..8)            OPTIONAL      -- Need OP
    },
    p-Max                                P-Max                         OPTIONAL,     -- Need OP
    freqBandIndicator                    FreqBandIndicator,
    schedulingInfoList                   SchedulingInfoList,
    tdd-Config                           TDD-Config                    OPTIONAL,     -- Cond TDD
    si-WindowLength                      ENUMERATED {
                                             ms1, ms2, ms5, ms10, ms15, ms20,
                                             ms40},
    systemInfoValueTag                   INTEGER (0..31),
    nonCriticalExtension                 SystemInformationBlockType1-v890-IEs       OPTIONAL
}

SystemInformationBlockType1-v1130-IEs ::= SEQUENCE {
    tdd-Config-v1130                     TDD-Config-v1130              OPTIONAL,     -- Cond TDD-OR
    cellSelectionInfo-v1130              CellSelectionInfo-v1130       OPTIONAL,     -- Cond WB-RSRQ
    nonCriticalExtension                 SystemInformationBlockType1-v12xy-IEs      OPTIONAL
}

SystemInformationBlockType1-v12xy-IEs ::= SEQUENCE {
    cellAccessRelatedInfo-v12xy          SEQUENCE {
        categoryOAllowed-r12                 ENUMERATED {true}         OPTIONAL      -- Need OR
    },
    p-Max2-r12                           P-Max                         OPTIONAL      -- Need OP
    nonCriticalExtension                 SEQUENCE {}                   OPTIONAL
}

PLMN-IdentityList ::=                SEQUENCE (SIZE (1..maxPLMN-r11)) OF PLMN-IdentityInfo PLMN-IdentityInfo ::=                SEQUENCE {
    plmn-Identity                        PLMN-Identity,
    cellReservedForOperatorUse           ENUMERATED {reserved, notReserved}
}
```

| SystemInformationBlockType1 field descriptions |
|---|
| p-Max<br>Value applicable for the cell. If absent the UE applies the maximum power according to the UE capability. |
| p-Max2<br>Value applicable on the cell for the UE supporting additionalSpectrumEmission2 broadcast in SystemInformationBlockType2. If absent the UE applies p-Max if broadcast or the maximum power according to the UE capability. |

SystemInformationBlockType2 information element

```
-- ASN1START
SystemInformationBlockType2 ::=     SEQUENCE {
    ac-BarringInfo                      SEQUENCE {
        ac-BarringForEmergency              BOOLEAN,
        ac-BarringForMO-Signalling          AC-BarringConfig                OPTIONAL,   -- Need OP
        ac-BarringForMO-Data                AC-BarringConfig                OPTIONAL,   -- Need OP
    }                                                                       OPTIONAL,   -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA                OPTIONAL,   -- Need OP
        ul-Bandwidth                        ENUMERATED {n6, n15, n25, n50, n75, n100}
                                                                            OPTIONAL,   -- Need OP
        additionalSpectrumEmission          AdditionalSpectrumEmission
    }, SystemInformationBlockType2-v9e0-IEs ::=    SEQUENCE {
    ul-CarrierFreq-v9e0                 ARFCN-ValueEUTRA-v9e0               OPTIONAL,   -- Cond ul-FreqMax
    nonCriticalExtension                SystemInformationBlockType2-v9xy-IEsSEQUENCE {}
                                                                            OPTIONAL
}
SystemInformationBlockType2-v9i0-IEs ::=    SEQUENCE {
    additionalSpectrumEmission2-r9      AdditionalSpectrumEmission          OPTIONAL,   -- Need OP
    multiBandInfoList2-r9               SEQUENCE (SIZE (1..maxMultiBands)) OF
                                        AdditionalSpectrumEmission          OPTIONAL    -- Need OR
    nonCriticalExtension                SEQUENCE {}                         OPTIONAL    -- Need OP
}
AC-BarringConfig ::=                SEQUENCE {
    ac-BarringFactor                    ENUMERATED {
                                            p00, p05, p10, p15, p20, p25, p30, p40,
                                            p50, p60, p70, p75, p80, p85, p90, p95},
    ac-BarringTime                      ENUMERATED {s4, s8, s16, s32, s64, s128, s256, s512},
    ac-BarringForSpecialAC              BIT STRING (SIZE(5))
}
```

| SystemInformationBlockType2 field descriptions |
|---|
| additionalSpectrumEmission<br>The UE requirements related to IE AdditionalSpectrumEmission are defined in TS 36.101 [42, table 6.2.4.1]. |
| additionalSpectrumEmission2<br>A UE receiving this field and for which the value is defined in TS 36.101 [42, table 6.2.4-1] as valid for the current cell band and bandwidth, shall apply this value instead of that received in *additionalSpectrumEmission*.<br>A UE receiving this field and for which the value is not defined in TS 36.101 [42, table 6.2.4-1] as valid for the current cell band and bandwidth, shall ignore this field and behave according to *additionalSpectrumEmission*. |
| mbsfn-SubframeConfigList<br>Defines the subframes that are reserved for MBSFN in downlink. |
| multiBandInfoList<br>A list of *additionalSpectrumEmission* i.e. one for each additional frequency band included in *multiBandInfoList* in *SystemInformationBlockType1*, listed in the same order. |
| multiBandInfoList2<br>A list of *additionalSpectrumEmission2* i.e. one for each additional frequency band included in *multiBandInfoList* in *SystemInformationBlockType1*, listed in the same order. |

UE-EUTRA-Capability information element

```
-- ASN1START
UE-EUTRA-Capability ::=        SEQUENCE {

UE-EUTRA-Capability-v9e0-IEs ::=   SEQUENCE {
    rf-Parameters-v9e0                 RF-Parameters-v9e0           OPTIONAL,
    nonCriticalExtension               UE-EUTRA-Capability-v9h0-Ies OPTIONAL
}
UE-EUTRA-Capability-v9h0-IEs ::=   SEQUENCE {
    interRAT-ParametersUTRA-v9h0       IRAT-ParametersUTRA-v9h0     OPTIONAL,
    -- Following field is only to be used for late REL-9 extensions
    lateNonCriticalExtension           OCTET STRING (CONTAINING UE-EUTRA-Capability-v9xy-IEs)
                                                                    OPTIONAL,
    -- Following field is only to be used for late extensions from REL-10
    nonCriticalExtension               SEQUENCE {}                  OPTIONAL
}
UE-EUTRA-Capability-v9xy-IEs ::=   SEQUENCE {
    rf-Parameters-v9xy                 RF-Parameters-v9xy           OPTIONAL,
    -- Following field is only to be used for late REL-9 extensions
    lateNonCriticalExtension           SEQUENCE {}                  OPTIONAL
}
<<skip unchanged part>>
RF-Parameters-v9xy ::=             SEQUENCE {
    modifiedMPR-Behavior-r9            BIT STRING (SIZE (32))       OPTIONAL
}
<<skip unchanged part>>
-- ASN1STOP
```

| UE-EUTRA-Capability field descriptions | FDD/ TDD diff |
|---|---|
| _modifiedMPR-Behavior_ <br> Field encoded as a bit map, where bit N is set to "1" if UE support modified MPR/A-MPR behaviour N, see 36.101 [42]. The leading / leftmost bit (bit 0) corresponds to modified MPR/A-MPR behaviour 0, the next bit corresponds to modified MPR/A-MPR behaviour 1 and so on. Absence of this field means that UE does not support any modified MPR/A-MPR behaviour. | -- |

FIG.8

```
SystemInformationBlockType5 information element

-- ASN1START

SystemInformationBlockType5 ::=      SEQUENCE {
    interFreqCarrierFreqList          InterFreqCarrierFreqList,
    ...,
    lateNonCriticalExtension                 OCTET STRING (CONTAINING SystemInformationBlockType5-
v8h0-IEs)           OPTIONAL        -- Need OP
}

SystemInformationBlockType5-v8h0-IEs ::=      SEQUENCE {
    interFreqCarrierFreqList-v8h0 SEQUENCE (SIZE (1..maxFreq)) OF InterFreqCarrierFreqInfo-v8h0
        OPTIONAL,-- Need OP
    nonCriticalExtension          SystemInformationBlockType5-v9e0-IEs     OPTIONAL  -- Need OP
}

SystemInformationBlockType5-v9e0-IEs ::=      SEQUENCE {
    interFreqCarrierFreqList-v9e0   SEQUENCE (SIZE (1..maxFreq)) OF InterFreqCarrierFreqInfo-v9e0
            OPTIONAL,       -- Need OR
    nonCriticalExtension         SystemInformationBlockType5-v9xy-IEs
        OPTIONAL        -- Need OP
}

SystemInformationBlockType5-v9xy-IEs ::=     SEQUENCE {
    interFreqCarrierFreqList-v9xy   SEQUENCE (SIZE (1..maxFreq)) OF InterFreqCarrierFreqInfo-v9xy
            OPTIONAL,       -- Need OR
    nonCriticalExtension         SEQUENCE {}                          OPTIONAL    -- Need OP
}

InterFreqCarrierFreqList ::=      SEQUENCE (SIZE (1..maxFreq)) OF InterFreqCarrierFreqInfo InterFreqCarrierFreqInfo ::=    SEQUENCE {
    dl-CarrierFreq                ARFCN-ValueEUTRA,
    q-RxLevMin                    Q-RxLevMin,
    p-Max                         P-Max                          OPTIONAL,  -- Need OP InterFreqCarrierFreqInfo-v9e0 ::=SEQUENCE {
    dl-CarrierFreq-v9e0           ARFCN-ValueEUTRA-v9e0 OPTIONAL,    -- Cond dl-FreqMax
    multiBandInfoList-v9e0        MultiBandInfoList-v9e0 OPTIONAL    -- Need OR
}

InterFreqCarrierFreqInfo-v9xy ::=SEQUENCE {
    multiMPR-InfoList-r9          SEQUENCE (SIZE (1..maxA-MPRs-r9)) OF MPR-Info-r9  OPTIONAL
    -- Need OR
}

InterFreqNeighCellList ::=    SEQUENCE (SIZE (1..maxCellInter)) OF InterFreqNeighCellInfo InterFreqNeighCellInfo ::=    SEQUENCE {
    physCellId                    PhysCellId,
    q-OffsetCell                  Q-OffsetRange
}

InterFreqBlackCellList ::=    SEQUENCE (SIZE (1..maxCellBlack)) OF PhysCellIdRange MPR-Info-r9 ::=       SEQUENCE {
    additionalSpectrumEmission    AdditionalSpectrumEmission,
    p-Max                         P-Max                          OPTIONAL,  -- Need OP
}

-- ASN1STOP
```

FIG.9

| SystemInformationBlockType5 field descriptions |
|---|
| *multiBandInfoList*<br>Indicates the list of frequency bands in addition to the band represented by *dl-CarrierFreq* for which cell reselection parameters are common. E-UTRAN indicates at most *maxMultiBands* frequency bands (i.e. the total number of entries across both *multiBandInfoList* and *multiBandInfoList-v9e0* is below this limit). |
| *multiMPR-InfoList*<br>A list of *additionalSpectrumEmission* and the associated Pmax in the order of priority. If p-Max is absent in the MPR-Info, the UE shall consider the *P-Max* in the *InterFreqCarrierFreqInfo* (without suffix) applicable. If the UE does not support any of the *additionalSpectrumEmission* in the list, the UE shall consider the *P-Max* in the *InterFreqCarrierFreqInfo* (without suffix) applicable. |
| *p-Max*<br>Value applicable for the neighbouring E-UTRA cells on this carrier frequency. If absent the UE applies the maximum power according to the UE capability. |
| *threshX-High*<br>Parameter "Thresh$_{X,\,HighP}$" in TS 36.304 [4]. |
| *threshX-Low*<br>Parameter "Thresh$_{X,\,LowP}$" in TS 36.304 [4]. |
| *t-ReselectionEUTRA*<br>Parameter "Treselection$_{EUTRA}$" in TS 36.304 [4]. |
| *t-ReselectionEUTRA-SF*<br>Parameter "Speed dependent ScalingFactor for Treselection$_{EUTRA}$" in TS 36.304 [4]. If the field is not present, the UE behaviour is specified in TS 36.304 [4]. |
| *q-OffsetFreq*<br>Parameter "Qoffset$_{frequency}$" in TS 36.304 [4]. |
| *interFreqNeighCellList*<br>List of inter-frequency neighbouring cells with specific cell re-selection parameters. |
| *q-OffsetCell*<br>Parameter "Qoffset$_{s,n}$" in TS 36.304 [4]. |
| *interFreqBlackCellList*<br>List of blacklisted inter-frequency neighbouring cells. |
| *interFreqCarrierFreqList*<br>List of neighbouring inter-frequencies. E-UTRAN does not configure more than one entry for the same physical frequency regardless of the E-ARFCN used to indicate this. If E-UTRAN includes *interFreqCarrierFreqList-v8h0* and/ or *interFreqCarrierFreqList-v9e0* and/or *interFreqCarrierFreqList-v9xy* it includes the same number of entries, and listed in the same order, as in *interFreqCarrierFreqList* (i.e. without suffix). See Annex D for more descriptions. |
| *q-QualMin*<br>Parameter "Q$_{qualmin}$" in TS 36.304 [4]. If the field is not present, the UE applies the (default) value of negative infinity for Q$_{qualmin}$. |
| *threshX-HighQ*<br>Parameter "Thresh$_{X,\,HighQ}$" in TS 36.304 [4]. |
| *threshX-LowQ*<br>Parameter "Thresh$_{X,\,LowQ}$" in TS 36.304 [4]. |

FIG.10

```
                    SystemInformationBlockType5 information element

-- ASN1START

SystemInformationBlockType5 ::=    SEQUENCE {
    interFreqCarrierFreqList        InterFreqCarrierFreqList,
    ...,
```

```
SystemInformationBlockType5-v9e0-IEs ::=   SEQUENCE {
    interFreqCarrierFreqList-v9e0   SEQUENCE (SIZE (1..maxFreq)) OF InterFreqCarrierFreqInfo-v9e0
            OPTIONAL,    -- Need OR
    nonCriticalExtension            SystemInformationBlockType5-v10xy-IEsSEQUENCE {}
            OPTIONAL    -- Need OP
}

SystemInformationBlockType5-v10xy-IEs ::=  SEQUENCE {
    interFreqCarrierFreqList-v10xy  SEQUENCE (SIZE (1..maxFreq)) OF InterFreqCarrierFreqInfo-v10xy
            OPTIONAL,    -- Need OR
    nonCriticalExtension            SEQUENCE {}                            OPTIONAL    -- Need OP
}

InterFreqCarrierFreqList ::=       SEQUENCE (SIZE (1..maxFreq)) OF InterFreqCarrierFreqInfo InterFreqCarrierFreqInfo ::=    SEQUENCE {
    dl-CarrierFreq                  ARFCN-ValueEUTRA,
    q-RxLevMin                      Q-RxLevMin,
    p-Max                           P-Max                      OPTIONAL,    -- Need OP
    t-ReselectionEUTRA              T-Reselection,
    t-ReselectionEUTRA-SF           SpeedStateScaleFactors     OPTIONAL,    -- Need OP
```

```
    [[  q-QualMin-r9                Q-QualMin-r9               OPTIONAL,    -- Need OP
        threshX-Q-r9                SEQUENCE {
            threshX-HighQ-r9            ReselectionThresholdQ-r9,
            threshX-LowQ-r9             ReselectionThresholdQ-r9
        }                                                      OPTIONAL    -- Cond RSRQ
    ]]
}

InterFreqCarrierFreqInfo-v8h0 ::=   SEQUENCE {
    multiBandInfoList               MultiBandInfoList          OPTIONAL    -- Need OR
}

InterFreqCarrierFreqInfo-v9e0 ::=  SEQUENCE {
    dl-CarrierFreq-v9e0             ARFCN-ValueEUTRA-v9e0   OPTIONAL,   -- Cond dl-FreqMax
    multiBandInfoList-v9e0          MultiBandInfoList-v9e0  OPTIONAL    -- Need OR
}

InterFreqCarrierFreqInfo-v10xy ::= SEQUENCE {
    additional-ns-values                    SEQUENCE (SIZE (1..maxMultiBands-Plus1)) OF P-maxNS-
valueList OPTIONAL   -- Need OR
}

P-maxNS-valueList ::=                       SEQUENCE {
        p-maxPerNS-value            SEQUENCE (SIZE (1..maxNS-values)) OF P-maxPerNS-value
        }

P-maxPerNS-value ::=                SEQUENCE {
        p-maxNew                    P-Max                          OPTIONAL,   -- Need OP
        additionalSpectrumEmission  AdditionalSpectrumEmission     OPTIONAL    -- Need OP
        }

InterFreqNeighCellList ::=          SEQUENCE (SIZE (1..maxCellInter)) OF InterFreqNeighCellInfo InterFreqNeighCellInfo ::=          SEQUENCE {
    physCellId                      PhysCellId,
```

FIG.11

| SystemInformationBlockType5 field descriptions |
|---|
| *additional-ns-values*<br>A list of additional P-max and NS-values for the band. First *P-maxNS-valueList* contains additional P-max and NS-values corresponding to *freqBandIndicator* in *SystemInformationBlockType1*. Subsequent *P-maxNS-valueList* correspond to each *additionalSpectrumEmission* included in *multiBandInfoList* in *SystemInformationBlockType2*, listed in the same order.<br><br>First pair of values in *P-maxNS-valueList* shall at most include *P-max* corresponding to *additionalSpectrumEmission* included in *freqInfo* or *multiBandInfoList*, subsequent pair of values includes at least *additionalSpectrumEmission*.<br><br>The UE shall apply the first supported additional spectrum emission in the list of the selected band. If none is supported then UE shall apply *additionalSpectrumEmission* included in *freqInfo* or *multiBandInfoList*. |

FIG.12

```
                    SystemInformationBlockType3 information element
-- ASN1START SystemInformationBlockType3 ::=    SEQUENCE {
    cellReselectionInfoCommon        SEQUENCE {
        q-Hyst                           ENUMERATED {
                                             dB0, dB1, dB2, dB3, dB4, dB5, dB6, dB8, dB10,
                                             dB12, dB14, dB16, dB18, dB20, dB22, dB24},
        speedStateReselectionPars        SEQUENCE {
            mobilityStateParameters          MobilityStateParameters,
            q-HystSF                         SEQUENCE {
                sf-Medium                        ENUMERATED {
                                                     dB-6, dB-4, dB-2, dB0},
                sf-High                          ENUMERATED {
                                                     dB-6, dB-4, dB-2, dB0}
            }
        }                                                        OPTIONAL    -- Need OP
    },
    cellReselectionServingFreqInfo   SEQUENCE {
        s-NonIntraSearch                 ReselectionThreshold    OPTIONAL,   -- Need OP
        threshServingLow                 ReselectionThreshold,
        cellReselectionPriority          CellReselectionPriority
    },
    intraFreqCellReselectionInfo     SEQUENCE {
        q-RxLevMin                       Q-RxLevMin,
        p-Max                            P-Max                   OPTIONAL,   -- Need OP
        s-IntraSearch                    ReselectionThreshold    OPTIONAL,   -- Need OP
        allowedMeasBandwidth             AllowedMeasBandwidth    OPTIONAL,   -- Need OP
        presenceAntennaPort1             PresenceAntennaPort1,
        neighCellConfig                  NeighCellConfig,
        t-ReselectionEUTRA               T-Reselection,
        t-ReselectionEUTRA-SF            SpeedStateScaleFactors  OPTIONAL    -- Need OP
    },
    ...,
    lateNonCriticalExtension             OCTET STRING  (CONTAINING
 intraFreqCellReselectionInfo-v9xy-IEs)          OPTIONAL, -- Need OP
    [[  s-IntraSearch-v920              SEQUENCE {
            s-IntraSearchP-r9                ReselectionThreshold,
            s-IntraSearchQ-r9                ReselectionThresholdQ-r9
        }                                                        OPTIONAL,   -- Need OP
        s-NonIntraSearch-v920            SEQUENCE {
            s-NonIntraSearchP-r9             ReselectionThreshold,
            s-NonIntraSearchQ-r9             ReselectionThresholdQ-r9
        }                                                        OPTIONAL,   -- Need OP
        q-QualMin-r9                     Q-QualMin-r9            OPTIONAL,   -- Need OP
        threshServingLowQ-r9             ReselectionThresholdQ-r9 OPTIONAL   -- Need OP
    ]]
}

IntraRreqCellReselectionInfo-v9xy-IEs ::=              SEQUENCE {
    multiMPR-InfoList-r9             SEQUENCE (SIZE (1..maxA-MPRs-r9)) OF MPR-Info-r9  OPTIONAL
    -- Need OR
}

MPR-Info-r9 ::=        SEQUENCE {
    additionalSpectrumEmission       AdditionalSpectrumEmission,
    p-Max                            P-Max                       OPTIONAL,   -- Need OP
}

-- ASN1STOP
```

FIG.13

| SystemInformationBlockType3 field descriptions |
|---|
| *cellReselectionInfoCommon*<br>Cell re-selection information common for cells. |
| *multiMPR-InfoList*<br>A list of *additionalSpectrumEmission* and the associated Pmax in the order of priority. If p-Max is absent in the MPR-Info, the UE shall consider the *P-Max* in the *intraFreqCellReselectionInfo* (without suffix) applicable. If the UE does not support any of the *additionalSpectrumEmission* in the list, the UE shall consider the *P-Max* in the *intraFreqCellReselectionInfo* (without suffix) applicable. |
| *q-Hyst*<br>Parameter $Q_{hyst}$ in 36.304 [4], Value in dB. Value dB1 corresponds to 1 dB, dB2 corresponds to 2 dB and so on. |
| *speedStateReselectionPars*<br>Speed dependent reselection parameters, see TS 36.304 [4]. If this field is absent, i.e, *mobilityStateParameters* is also not present, UE behaviour is specified in TS 36.304 [4]. |
| *q-HystSF*<br>Parameter "Speed dependent ScalingFactor for $Q_{hyst}$" in TS 36.304 [4]. The sf-Medium and sf-High concern the additional hysteresis to be applied, in Medium and High Mobility state respectively, to $Q_{hyst}$ as defined in TS 36.304 [4]. In dB. Value dB-6 corresponds to -6dB, dB-4 corresponds to -4dB and so on. |
| *t-ReselectionEUTRA*<br>Parameter "Treselection$_{EUTRA}$" in TS 36.304 [4]. |
| *t-ReselectionEUTRA-SF*<br>Parameter "Speed dependent ScalingFactor for Treselection$_{EUTRA}$" in TS 36.304 [4]. If the field is not present, the UE behaviour is specified in TS 36.304 [4]. |
| *q-RxLevMin*<br>Parameter "$Q_{rxlevmin}$" in TS 36.304 [4], applicable for intra-frequency neighbour cells. |
| *s-IntraSearch*<br>Parameter "$S_{IntraSearchP}$" in TS 36.304 [4]. If the field *s-IntraSearchP* is present, the UE applies the value of *s-IntraSearchP* instead. Otherwise if neither *s-IntraSearch* nor *s-IntraSearchP* is present, the UE applies the (default) value of infinity for $S_{IntraSearchP}$. |
| *cellReselectionServingFreqInfo*<br>Information common for Cell re-selection to inter-frequency and inter-RAT cells. |
| *s-NonIntraSearch*<br>Parameter "$S_{nonIntraSearchP}$" in TS 36.304 [4]. If the field *s-NonIntraSearchP* is present, the UE applies the value of *s-NonIntraSearchP* instead. Otherwise if neither *s-NonIntraSearch* nor *s-NonIntraSearchP* is present, the UE applies the (default) value of infinity for $S_{nonIntraSearchP}$. |
| *threshServingLow*<br>Parameter "Thresh$_{Serving, LowP}$" in TS 36.304 [4]. |
| *intraFreqcellReselectionInfo*<br>Cell re-selection information common for intra-frequency cells. |
| *p-Max*<br>Value applicable for the intra-frequency neighbouring E-UTRA cells. If absent the UE applies the maximum power according to the UE capability. |
| *allowedMeasBandwidth*<br>If absent, the value corresponding to the downlink bandwidth indicated by the *dl-Bandwidth* included in *MasterInformationBlock* applies. |
| *s-IntraSearchP*<br>Parameter "$S_{IntraSearchP}$" in TS 36.304 [4]. See descriptions under *s-IntraSearch*. |
| *s-IntraSearchQ*<br>Parameter "$S_{IntraSearchQ}$" in TS 36.304 [4]. If the field is not present, the UE applies the (default) value of 0 dB for $S_{IntraSearchQ}$. |
| *s-NonIntraSearchP*<br>Parameter "$S_{nonIntraSearchP}$" in TS 36.304 [4]. See descriptions under *s-NonIntraSearch*. |
| *s-NonIntraSearchQ*<br>Parameter "$S_{nonIntraSearchQ}$" in TS 36.304 [4]. If the field is not present, the UE applies the (default) value of 0 dB for $S_{nonIntraSearchQ}$. |
| *q-QualMin*<br>Parameter "$Q_{qualmin}$" in TS 36.304 [4], applicable for intra-frequency neighrbour cells. If the field is not present, the UE applies the (default) value of negative infinity for $Q_{qualmin}$. |
| *threshServingLowQ*<br>Parameter "Thresh$_{Serving, LowQ}$" in TS 36.304 [4]. |

FIG.14

```
                    SystemInformationBlockType3 information element
-- ASN1START SystemInformationBlockType3 ::=        SEQUENCE {
    cellReselectionInfoCommon              SEQUENCE {
        q-Hyst                                 ENUMERATED {
                                                   dB0, dB1, dB2, dB3, dB4, dB5, dB6, dB8, dB10,
                                                   dB12, dB14, dB16, dB18, dB20, dB22, dB24},
        speedStateReselectionPars              SEQUENCE {
            mobilityStateParameters                MobilityStateParameters,
            q-HystSF                               SEQUENCE { q-RxLevMin                             Q-RxLevMin,
        p-Max                                  P-Max                          OPTIONAL,    -- Need OP
        s-IntraSearch                          ReselectionThreshold           OPTIONAL,    -- Need OP
        allowedMeasBandwidth                   AllowedMeasBandwidth           OPTIONAL,    -- Need OP
        presenceAntennaPort1                   PresenceAntennaPort1,
        neighCellConfig                        NeighCellConfig,
        t-ReselectionEUTRA                     T-Reselection,
        t-ReselectionEUTRA-SF                  SpeedStateScaleFactors         OPTIONAL     -- Need OP
    },
    ...,
    lateNonCriticalExtension               OCTET STRING (CONTAINING SystemInformationBlockType3-
v10xy-IEs)          OPTIONAL,   -- Need OP
    [[  s-IntraSearch-v920                    SEQUENCE {
            s-IntraSearchP-r9                      ReselectionThreshold,
            s-IntraSearchQ-r9                      ReselectionThresholdQ-r9
        }                                                                     OPTIONAL,    -- Need OP
        s-NonIntraSearch-v920                  SEQUENCE {
            s-NonIntraSearchP-r9                   ReselectionThreshold,
            s-NonIntraSearchQ-r9                   ReselectionThresholdQ-r9
        }                                                                     OPTIONAL,    -- Need OP
        q-QualMin-r9                           Q-QualMin-r9                   OPTIONAL,    -- Need OP
        threshServingLowQ-r9                   ReselectionThresholdQ-r9       OPTIONAL     -- Need OP
    ]]
}

SystemInformationBlockType3-v10xx-IEs ::=        SEQUENCE {
    additional-ns-values                             SEQUENCE (SIZE (1..maxMultiBands-Plus1)) OF P-maxNS-
valueList OPTIONAL,     -- Need OR
    nonCriticalExtension                 SEQUENCE {}                              OPTIONAL    -- Need OP
}

P-maxNS-valueList ::=                    SEQUENCE {
    p-maxPerNS-value                         SEQUENCE (SIZE (1..maxNS-values)) OF P-maxPerNS-value
}

P-maxPerNS-value ::=                     SEQUENCE {
    p-maxNew                                 P-Max                          OPTIONAL,    -- Need OP
    additionalSpectrumEmission               AdditionalSpectrumEmission     OPTIONAL     -- Need OP
}

-- ASN1STOP
```

FIG.15

| SystemInformationBlockType3 field descriptions |
|---|
| additional-ns-values |
| A list of additional P-max and NS-values for the band. First *P-maxNS-valueList* contains additional P-max and NS-values corresponding to *freqBandIndicator* in *SystemInformationBlockType1*. Subsequent *P-maxNS-valueList* correspond to each *additionalSpectrumEmission* included in *multiBandInfoList* in *SystemInformationBlockType2*, listed in the same order. |
| First pair of values in *P-maxNS-valueList* shall at most include *P-max* corresponding to *additionalSpectrumEmission* included in *freqInfo* or *multiBandInfoList*, subsequent pair of values includes at least *additionalSpectrumEmission*. |
| The UE shall apply the first supported additional spectrum emission in the list of the selected band. If none is supported then UE shall apply *additionalSpectrumEmission* included in *freqInfo* or *multiBandInfoList*. |

FIG.16

```
                    SystemInformationBlockType1 message
-- ASN1START

SystemInformationBlockType1 ::=      SEQUENCE {
    cellAccessRelatedInfo                SEQUENCE {
        plmn-IdentityList                    PLMN-IdentityList,
        trackingAreaCode                     TrackingAreaCode,
        cellIdentity                         CellIdentity,
        cellBarred                           ENUMERATED {barred, notBarred},
        intraFreqReselection                 ENUMERATED {allowed, notAllowed},
        csg-Indication                       BOOLEAN,
        csg-Identity                         CSG-Identity            OPTIONAL     -- Need OR
    },
    cellSelectionInfo                    SEQUENCE {
        q-RxLevMin                           Q-RxLevMin,
        q-RxLevMinOffset                     INTEGER (1..8)          OPTIONAL     -- Need OP
    },
    p-Max                                P-Max                       OPTIONAL,              -- Need OP
    freqBandIndicator                    FreqBandIndicator,
    schedulingInfoList                   SchedulingInfoList,
    tdd-Config                           TDD-Config                  OPTIONAL,    -- Cond TDD
    si-WindowLength                      ENUMERATED {
                                             ms1, ms2, ms5, ms10, ms15, ms20,
                                             ms40},
    systemInfoValueTag                   INTEGER (0..31),
    nonCriticalExtension                 SystemInformationBlockType1-v890-IEs
    OPTIONAL
}

SystemInformationBlockType1-v890-IEs::= SEQUENCE {
    lateNonCriticalExtension                     OCTET STRING (CONTAINING SystemInformationBlockType1-
v8h0-IEs)           OPTIONAL,       -- Need OP
    nonCriticalExtension                         SystemInformationBlockType1-v920-IEs    OPTIONAL
}

SystemInformationBlockType1-v8h0-IEs ::=     SEQUENCE {
    multiBandInfoList                    MultiBandInfoList     OPTIONAL,    -- Need OR
    nonCriticalExtension                 SystemInformationBlockType1-v9e0-IEs     OPTIONAL       -- Need OP
}

SystemInformationBlockType1-v9e0-IEs ::= SEQUENCE {
    freqBandIndicator-v9e0               FreqBandIndicator-v9e0     OPTIONAL,    -- Cond FBI-max
    multiBandInfoList-v9e0               MultiBandInfoList-v9e0     OPTIONAL,    -- Cond mFBI-max
    nonCriticalExtension                 SystemInformationBlockType1-v9xy-IEs
    OPTIONAL        -- Need OP
}

SystemInformationBlockType1-v9xy-IEs ::=     SEQUENCE {
    multiMPR-InfoList-r9                 SEQUENCE (SIZE (1..maxA-MPRs-r9)) OF MPR-Info-r9  OPTIONAL
    -- Need OR
    nonCriticalExtension                 SystemInformationBlockType1-v9e0-IEs     OPTIONAL       -- Need OP
}

SystemInformationBlockType1-v920-IEs ::=     SEQUENCE {
    ims-EmergencySupport-r9              ENUMERATED {true}           OPTIONAL,    -- Need OR
    cellSelectionInfo-v920               CellSelectionInfo-v920                   OPTIONAL,     -- Cond RSRQ
    nonCriticalExtension                 SEQUENCE {}                              OPTIONAL      -- Need OP
}

MPR-Info-r9 ::=             SEQUENCE {
    additionalSpectrumEmission         AdditionalSpectrumEmission,
    p-Max                              P-Max                        OPTIONAL,    -- Need OP
}
```

FIG.17

```
                    SystemInformationBlockType1 message
-- ASN1START

SystemInformationBlockType1 ::=    SEQUENCE {
    cellAccessRelatedInfo              SEQUENCE {
        plmn-IdentityList                  PLMN-IdentityList,
```

```
SystemInformationBlockType1-v8h0-IEs  ::=   SEQUENCE {
    multiBandInfoList          MultiBandInfoList       OPTIONAL,    -- Need OR
    nonCriticalExtension       SystemInformationBlockType1-v9e0-IEs    OPTIONAL    -- Need
OP
}

SystemInformationBlockType1-v9e0-IEs ::= SEQUENCE {
    freqBandIndicator-v9e0        FreqBandIndicator-v9e0     OPTIONAL,      -- Cond FBI-max
    multiBandInfoList-v9e0        MultiBandInfoList-v9e0     OPTIONAL,      -- Cond mFBI-max
    nonCriticalExtension          SystemInformationBlockType1-v10xySEQUENCE {}
    OPTIONAL    -- Need OP
}

SystemInformationBlockType1-v920-IEs ::=     SEQUENCE {
    ims-EmergencySupport-r9         ENUMERATED {true}           OPTIONAL,      -- Need OR
    cellSelectionInfo-v920          CellSelectionInfo-v920      OPTIONAL,      -- Cond RSRQ
    nonCriticalExtension            SEQUENCE {}                 OPTIONAL       -- Need OP
}

SystemInformationBlockType1-v10xx-IEs ::=  SEQUENCE {
    additional-ns-values                  SEQUENCE (SIZE (1..maxMultiBands-Plus1)) OF P-maxNS-
valueList OPTIONAL,   -- Need OR
    nonCriticalExtension          SEQUENCE {}                     OPTIONAL    -- Need OP
}

P-maxNS-valueList ::=                      SEQUENCE {
        p-maxPerNS-value              SEQUENCE (SIZE (1..maxNS-values)) OF P-maxPerNS-value
        }

P-maxPerNS-value ::=                 SEQUENCE {
        p-maxNew                  P-Max                             OPTIONAL,   -- Need OP
        additionalSpectrumEmission  AdditionalSpectrumEmission      OPTIONAL    -- Need OP
        }

PLMN-IdentityList ::=              SEQUENCE (SIZE (1..6)) OF PLMN-IdentityInfo

PLMN-IdentityInfo ::=              SEQUENCE {
    plmn-Identity                      PLMN-Identity,
    cellReservedForOperatorUse         ENUMERATED {reserved, notReserved}
}

SchedulingInfoList ::= SEQUENCE (SIZE (1..maxSI-Message)) OF SchedulingInfo
```

FIG.18

| SystemInformationBlockType1 field descriptions |
|---|
| additional-ns-values<br>A list of additional P-max and NS-values for the band. First *P-maxNS-valueList* contains additional P-max and NS-values corresponding to *freqBandIndicator* in SystemInformationBlockType1. Subsequent *P-maxNS-valueList* correspond to each *additionalSpectrumEmission* included in *multiBandInfoList* in SystemInformationBlockType2, listed in the same order.<br><br>First pair of values in *P-maxNS-valueList* shall at most include *P-max* corresponding to *additionalSpectrumEmission* included in *freqInfo* or *multiBandInfoList*, subsequent pair of values includes at least *additionalSpectrumEmission*.<br><br>The UE shall apply the first supported additional spectrum emission in the list of the selected band. If none is supported then UE shall apply *additionalSpectrumEmission* included in *freqInfo* or *multiBandInfoList*. |

FIG.19

```
                    SystemInformationBlockType2 information element
- ASN1START SystemInformationBlockType2 ::=     SEQUENCE {
    ac-BarringInfo                      SEQUENCE {
        ac-BarringForEmergency              BOOLEAN,
        ac-BarringForMO-Signalling          AC-BarringConfig        OPTIONAL,    -- Need OP
        ac-BarringForMO-Data                AC-BarringConfig        OPTIONAL     -- Need OP
    }                                                               OPTIONAL,    -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA        OPTIONAL,    -- Need OP
        ul-Bandwidth                        ENUMERATED {n6, n15, n25, n50, n75, n100}
                                                                    OPTIONAL,    -- Need OP

[[  ssac-BarringForMMTEL-Voice-r9     AC-BarringConfig          OPTIONAL,    -- Need OP
        ssac-BarringForMMTEL-Video-r9     AC-BarringConfig          OPTIONAL     -- Need OP
    ]],
    [[  ac-BarringForCSFB-r10             AC-BarringConfig          OPTIONAL     -- Need OP
    ]]
}

SystemInformationBlockType2-v8h0-IEs ::=   SEQUENCE {
    multiBandInfoList          SEQUENCE (SIZE (1..maxMultiBands)) OF AdditionalSpectrumEmission
        OPTIONAL,     -- Need OR
    nonCriticalExtension       SystemInformationBlockType2-v9e0-IEs   OPTIONAL    -- Need OP
}

SystemInformationBlockType2-v9e0-IEs ::= SEQUENCE {
    ul-CarrierFreq-v9e0            ARFCN-ValueEUTRA-v9e0       OPTIONAL,   -- Cond ul-FreqMax
    nonCriticalExtension           SystemInformationBlockType2-v10xx-IEsSEQUENCE {}
        OPTIONAL   -- Need OP
}

SystemInformationBlockType2-v10xx-IEs ::=  SEQUENCE {
    additional-ns-values               SEQUENCE (SIZE (1..maxMultiBands-Plus1)) OF P-maxNS-
valueList OPTIONAL,    -- Need OR
    nonCriticalExtension       SEQUENCE {}                      OPTIONAL    -- Need OP
}

P-maxNS-valueList ::=                  SEQUENCE {
        p-maxPerNS-value       SEQUENCE (SIZE (1..maxNS-values)) OF P-maxPerNS-value
        }

P-maxPerNS-value ::=           SEQUENCE {
        p-maxNew                   P-Max                        OPTIONAL,   -- Need OP
        additionalSpectrumEmission  AdditionalSpectrumEmission  OPTIONAL    -- Need OP
        }

AC-BarringConfig ::=           SEQUENCE {
    ac-BarringFactor                   ENUMERATED {
                                           p00, p05, p10, p15, p20, p25, p30, p40,
```

FIG.20

| SystemInformationBlockType2 field descriptions |
|---|
| *additional-ns-values*<br>A list of additional P-max and NS-values for the band. First *P-maxNS-valueList* contains additional P-max and NS-values corresponding to *freqBandIndicator* in SystemInformationBlockType1. Subsequent *P-maxNS-valueList* correspond to each *additionalSpectrumEmission* included in *multiBandInfoList* in SystemInformationBlockType2, listed in the same order. |
| First pair of values in *P-maxNS-valueList* shall at most include *P-max* corresponding to *additionalSpectrumEmission* included in *freqInfo* or *multiBandInfoList*, subsequent pair of values includes at least *additionalSpectrumEmission*. |
| The UE shall apply the first supported additional spectrum emission in the list of the selected band. If none is supported then UE shall apply *additionalSpectrumEmission* included in *freqInfo* or *multiBandInfoList*. |

USER APPARATUS, MOBILE COMMUNICATION SYSTEM, AND MAXIMUM TRANSMISSION POWER DETERMINATION METHOD

TECHNICAL FIELD

The present invention relates to a technique for determining a maximum transmission power in a user apparatus of a mobile communication system.

BACKGROUND ART

In LTE (Long Term Evolution) scheme, out-of-band emission rules and the like are defined such that interference is not exerted to radio systems used in the same area. In general, the rules are defined by domestic regulations, so that communication carriers are required to operate radio systems based on the rules.

On the other hand, it is assumed that, depending on usage of bands or on the system types, there is a case where sufficient attenuation cannot be obtained for allowed interference level to adjacent systems.

Especially, in LTE, since wideband transmission is performed, noise due to spurious tends to reach far-apart frequency with a high level. Thus, there is a case where satisfying the rules is not realistic by suppression using an analog device such as a duplexer.

For dealing with such a case, in the LTE scheme, a rule is specified such that the transmission power of the user apparatus UE may be reduced according to transmission position and the number of RBs (resource blocks). An allowable maximum reduction amount of transmission power is defined as "A-MPR (Additional-Maximum Power Reduction)" (refer to non-patent document 1).

However, since the radio system that should be protected does not always exist in each country and each area, application of the A-MPR is allowed when a specific signal "NS (Network Signaling) value" (to be referred to as NS value hereinafter) is broadcasted from a network (base station eNB).

The NS value is a value broadcasted by additionalSpectrumEmission of SIB2 (SystemInformationBlockType2) (non-patent document 2). FIG. 1 shows an example of NS values and corresponding transmission conditions (Requirements, band, bandwidth, the number of RBs, allowable A-MPR value) (excerpt from Table 6.2.4-1 of non-patent document 1). More specifically, the "transmission condition" is referred to as "additional spectrum emission mask and Additional spurious emissions requirements" (additional spectrum emission and Additional spurious emissions requirements).

For example, when a user apparatus UE that is residing in a cell and that receives NS_05 from the base station eNB uses the number of RBs corresponding to NS_05 of FIG. 1, A-MPR equal to or less than 1 dB is permitted for a transmission power defined in "6.6.3.3.1 Minimum requirement (network signaled value "NS_05")" of the non-patent document 2.

The NS value is defined as necessary for each band (operating band) and channel bandwidth (channel bandwidth). Although the NS value is broadcasted from the network, the value of A-MPR is implemented in the user apparatus UE. Thus, the network side only determines whether to apply it or not, and broadcasts the NS value.

Operation of a user apparatus UE receiving an NS value that is not defined for all channel bandwidths of a band that the user apparatus uses or for a specific channel bandwidth of the band is not specified. However, the user apparatus UE can understand NS_01 (no A-MPR) by default in any band and any channel bandwidth.

RELATED ART DOCUMENT

Non Patent Document

[NON PATENT DOCUMENT 1] 3GPP TS 36.101 V12.4.0 (2014-06)
[NON PATENT DOCUMENT 2] 3GPP TS 36.331 V12.2.0 (2014-06)

SUMMARY OF THE INVENTION

Problem to be Solved by the Invention

In a case where a regulation is newly added after standardization of a band has completed, or where a specific band suddenly comes into use in another country with a specific protection standard, although a new NS value and/or application condition of related A-MPR is specified, a user apparatus UE that is already commercially released cannot understand the new NS value (unexpected NS). Thus, there is a possibility that operation after receiving it not clear (there is a possibility that the UE does not meet the regulation, or the UE does not camp on the cell).

The present invention is contrived in view of the above-mentioned points, and an object of the present invention is to provide a technique, in a cell where system information on a new transmission condition is broadcasted, for enabling not only a user apparatus that can understand the new transmission condition but also a user apparatus that cannot understand the new transmission condition to perform transmission by using a proper maximum transmission power.

Means for Solving the Problem

According to an embodiment of the present invention, there is provided a user apparatus in a mobile communication system including a base station and the user apparatus, including:

reception means configured to receive, from the base station, first system information including a first maximum transmission power value and a second maximum transmission power value, and second system information including a first signaling value and a second signaling value; and control means configured, when determining that the second signaling value included in the second system information is a value defined as a transmission condition in a cell where the user apparatus resides, to determine the second maximum transmission power value corresponding to the second signaling value as a maximum transmission power value for use in the cell.

According to an embodiment of the present invention, there is provided a user apparatus in a mobile communication system including a base station and the user apparatus, including:

reception means configured to receive, from the base station, system information that includes a plurality of signaling values and a plurality of maximum transmission power values that correspond to the plurality of signaling values respectively; and control means configured to select one signaling value from among the plurality of signaling values included in the system information, and to execute cell selection or cell reselection using a maximum transmission power corresponding to the one signaling value.

According to an embodiment of the present invention, there is provided a mobile communication system including a base station and a user apparatus, the base station including:

transmission means configured to transmit first system information including a first maximum transmission power value and a second maximum transmission power value, and second system information including a first signaling value and a second signaling value, the user apparatus including:

reception means configured to receive the first system information and the second system information from the base station; and control means configured, when determining that the second signaling value included in the second system information is a value defined as a transmission condition in a cell where the user apparatus resides, to determine the second maximum transmission power value corresponding to the second signaling value as a maximum transmission power value for use in the cell.

According to an embodiment of the present invention, there is provided a maximum transmission power determination method executed by a user apparatus in a mobile communication system including a base station and the user apparatus, including:

a reception step of receiving, from the base station, first system information including a first maximum transmission power value and a second maximum transmission power value, and second system information including a first signaling value and a second signaling value; and a step of, when determining that the second signaling value included in the second system information is a value defined as a transmission condition in a cell where the user apparatus resides, determining the second maximum transmission power value corresponding to the second signaling value as a maximum transmission power value for use in the cell.

According to an embodiment of the present invention, there is provided a maximum transmission power determination method executed by a mobile communication system including a base station and the user apparatus, including:

a step in which the base station transmits first system information including a first maximum transmission power value and a second maximum transmission power value, and second system information including a first signaling value and a second signaling value, a step in which the user apparatus receives the first system information and the second system information from the base station; and a step in which, when the user apparatus determines that the second signaling value included in the second system information is a value defined as a transmission condition in a cell where the user apparatus resides, the user apparatus determines the second maximum transmission power value corresponding to the second signaling value as a maximum transmission power value for use in the cell.

Effect of the Present Invention

According to an embodiment of the present invention, there is provided a technique, in a cell where system information on a new transmission condition is broadcasted, for enabling not only a user apparatus that can understand the new transmission condition but also a user apparatus that cannot understand the new transmission condition to perform transmission by using a proper maximum transmission power.

BRIEF DESCRIPTION OF THE DRAWINGS

FIG. 1 is a diagram showing an example of A-MPR;

FIG. 4 is a diagram showing a flowchart of processes in the present embodiment;

FIG. 5A is a diagram showing a specification change example of a SIB1 message;

FIG. 5B is a diagram showing a specification change example of a SIB1 message;

FIG. 6A is a diagram showing a specification change example of a SIB2 message;

FIG. 6B is a diagram showing a specification change example of a SIB2 message;

FIG. 7A is a diagram showing a specification change example of UE-EUTRA-Capability information element;

FIG. 7B is a diagram showing a specification change example of UE-EUTRA-Capability information element;

FIG. 8 is a diagram showing a specification change example of a SIB5 message;

FIG. 9 is a diagram showing a specification change example of a SIB5 message;

FIG. 10 is a diagram showing a specification change example of a SIB5 message;

FIG. 11 is a diagram showing a specification change example of a SIB5 message;

FIG. 12 is a diagram showing a specification change example of a SIB3 message;

FIG. 13 is a diagram showing a specification change example of a SIB3 message;

FIG. 14 is a diagram showing a specification change example of a SIB3 message;

FIG. 15 is a diagram showing a specification change example of a SIB3 message;

FIG. 16 is a diagram showing a specification change example of a SIB1 message;

FIG. 17 is a diagram showing a specification change example of a SIB1 message;

FIG. 18 is a diagram showing a specification change example of a SIB1 message;

FIG. 19 is a diagram showing a specification change example of a SIB2 message;

FIG. 20 is a diagram showing a specification change example of a SIB2 message;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. Although a mobile communication system of LTE is intended in the present embodiment, the present invention is not limited to LTE, and can be applied to other mobile communication systems. In the specification and the claims, the term "LTE" is used as meaning of schemes of releases on or after release 8 of 3GPP.

(System Whole Configuration)

Figure 2:
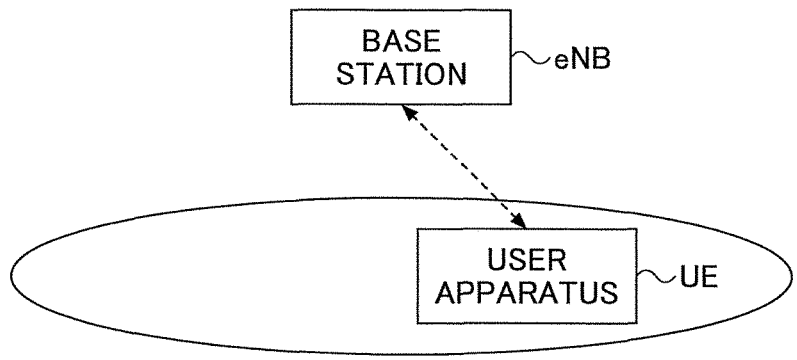
FIG. 2 is a block diagram of a communication system of an embodiment of the present invention.

FIG. 2 shows a block diagram of a communication system in an embodiment of the present invention. As shown in FIG. 2, the communication system of the present embodiment includes a base station eNB and a user apparatus UE. Although FIG. 2 shows one base station eNB and one user apparatus UE, this is merely an example, and there may be a plurality of base stations eNB and user apparatuses UE.

Sequence Example

Figure 3:
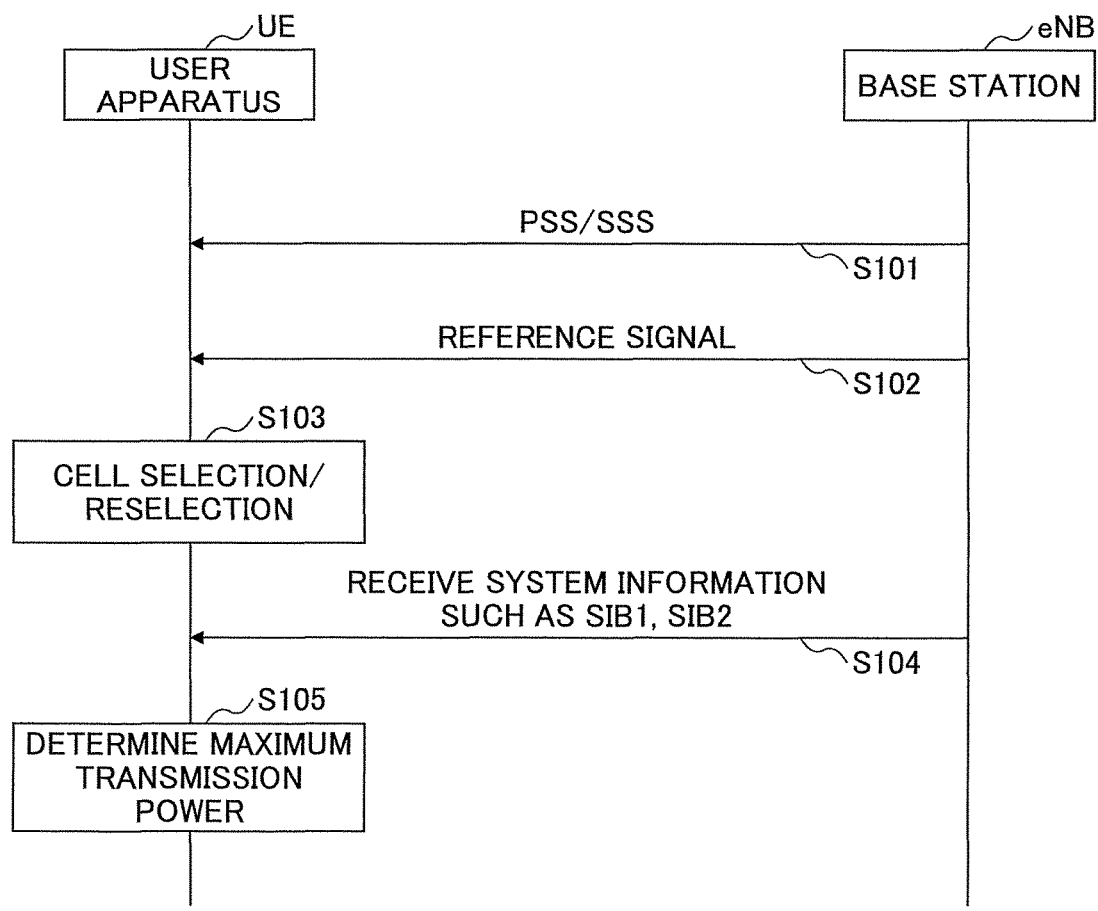
FIG. 3 is a diagram showing a process sequence example in the present embodiment.

In the present embodiment, since the user apparatus UE determines a maximum transmission power based on information included in SIB1, SIB2 that the user apparatus UE receives from the base station eNB, an example of a sequence including reception of SIB1 and SIB2 is described first with reference to FIG. 3. FIG. 3 shows, as an example, an example of operation when performing cell selection/cell reselection in an RRC idle state.

In the example of FIG. 3, the user apparatus UE receives a synchronization signal (PSS/SSS) from the base station eNB by cell search (step 101) so as to establish synchronization and obtain a cell ID (PCI). For the cell synchronized by the synchronization signal, the user apparatus UE receives a reference signal (CRS) from the base station eNB to perform measurement of RSRP (step 102).

In step 103, a cell of the base station eNB is selected as a cell in which RSRP of the reference signal is the highest (best cell).

In step 104, the user apparatus UE receives system information such as SIB1, SIB2 and the like broadcasted from the base station eNB. In step 105, the user apparatus UE determines a maximum transmission power applied to the user apparatus UE based on information of an NS value included in SIB2 and information of a maximum transmission power (also to be referred to as maximum output power) included in SIB1.

The user apparatus UE determines a DL channel bandwidth that the user apparatus UE applies in the cell by DL bandwidth information included in MIB. Also, the user apparatus UE determines a band (operating band) that the user apparatus applies in the cell based on band information included in SIB1. Unless UL bandwidth information is included in SIB2, the UL channel bandwidth is regarded to be the same as that of DL. When SIB2 includes UL bandwidth information, the user apparatus UE determines a value broadcasted by SIB2 as the UL channel bandwidth.

(Details of Processing)

The base station eNB in the present embodiment broadcasts an NS value of the own cell by additionalSpectrumEmission in SIB2, and broadcasts a maximum transmission power by p-Max which is an IE in the SIB1. More specifically, the maximum transmission power broadcasted by p-Max is used as $P_{EMAX}$ as indicated in 6.2.5 in the non-patent documents 1 (the same applies to after-mentioned p-Max2).

As an example, in a cell A, NS_01 is broadcasted as additionalSpectrumEmission, and 18 dBm is broadcasted as p-Max for the NS_01. Also, in another cell B, for example, NS_50 is broadcasted as additionalSpectrumEmission, and 23 dBm is broadcasted as p-Max for the NS_50. In this example, it is assumed that a UE residing in the cell B can understand the NS_50.

Accordingly, low transmission power is applied for a UE in the cell A where restrictions are not strict, that is, NS_01 in which A-MPR is not allowed is applied, so that uplink interference is suppressed. On the other hand, for a UE of the cell B, where regulations are strict, to which NS_50 is applied, transmission of the maximum value (23 dBm) of the UE capability is permitted.

That is, since the latter UE can perform transmission according to a strict transmission condition (example: A-MPR is permitted) specified for the NS_50, a large value can be reported as p-Max. Accordingly, in a condition where transmission can be performed with a large transmission power (example: small number of RBs), a large transmission power can be used. On the other hand, for the UE in the cell A that receives a small p-Max, even if a transmission method (example: RB position, the number of RBs) that does not actuary exert influence to the surrounding is used, the transmission power is restricted small by the p-Max.

Here, for example, a case is assumed in which, although all user apparatuses UE can understand NS_01, NS_50 is a newly specified NS value for a new regulation, and only a part of new UEs (to be referred to as new UE hereinafter) can understand NS_50, but other UEs (to be referred to as old UEs) cannot understand NS_50.

In this case, in a case where an old UE resides in a cell where NS_50 is broadcasted like the cell B, since the old UE cannot understand NS_50, it is considered that the old UE performs communication that does not meet the regulation or performs operation not to camp on the cell B depending on the implementation of the old UE.

In order to avoid such a situation, it can be considered that, although the cell B, under normal circumstances, wants UEs to perform transmission according to the transmission condition of NS_50, the cell B unavoidably broadcasts NS_01 that all UEs can understand, and the cell B broadcasts a small p-Max such that the transmission condition of NS_50 is satisfied in any cases (the number of RBs, RE position, and the like)(that is, for making influence to adjacent systems assumed in NS_50 to be equal to or less than a predetermined value).

However, in the above-mentioned case, even in a situation in which a new UE that can understand NS_50 would be able to use larger transmission power, a small transmission power is used, so that there is a possibility that the performance of the whole system is deteriorated.

Therefore, in the present embodiment, assuming a situation in which a new UE and an old UE coexist in the cell, two NS values are broadcasted as NS values in the cell, and p-Max is broadcasted for each NS value. Here, as an example, an NS value that is considered to be understood by all UEs is broadcasted by additionalSpectrumEmission, and a maximum transmission power corresponding to this is broadcasted by p-Max, and a second NS value that is considered to be understood only by a new UE is broadcasted by "additionalSpectrumEmission2", and a maximum transmission power corresponding to this is broadcasted by "p-Max2".

In the example of the above-mentioned cell B where the transmission condition corresponding to NS_50 is desired to be imposed to UEs, for example, NS_01 is broadcasted by additionalSpectrumEmission and 18 dBm is broadcasted by p-Max, and in addition to that, NS_50 is broadcasted by additionalSpectrumEmission2 and 23 dBm is broadcasted by p-Max2.

When the user apparatus UE that receives the above-mentioned broadcast information in cell B can determine the value of additionalSpectrumEmission2 (NS_50 in this example) to be a valid value (a value specified for the band and the channel bandwidth for the current cell), the user apparatus UE operates according to the condition corresponding to NS_50, and uses p-Max2 (23 dBm) as a maximum transmission power. Also, when the user apparatus UE that receives the broadcast information in cell B cannot determine the value of additionalSpectrumEmission2 (NS_50 in this example) to be a valid value, the user apparatus UE operates according to additionalSpectrumEmission (NS_01), and uses p-Max (18 dBm) as a maximum transmission power. When p-Max is not broadcasted, the user apparatus UE uses a value of a maximum transmission power that the user apparatus UE has as a UE capability instead of the p-Max.

Processes of the user apparatus UE are described with reference to a flowchart of FIG. 4 in a case where the two types of NS values and p-Maxes are broadcasted from the base station eNB as mentioned above.

The user apparatus UE receives SIB1 and SIB2 from the base station eNB of a cell (step 201). By the way, system information such as SIB1 and SIB2 are broadcasted periodically, so that the user apparatus UE receives it periodically. For example, even after the user apparatus UE once obtained necessary information (NS value, p-Max and the like) from SIB1 and SIB2, the user apparatus UE may read SIB1 and SIB2 as necessary and check the information.

It is assumed that the user apparatus UE here corresponds to the before-mentioned "new UE", so that the user apparatus UE can read additionalSpectrumEmission2 from SIB2.

In the case where the user apparatus UE can read additionalSpectrumEmission2, and determines that an NS value specified by the additionalSpectrumEmission2 is a valid value (Yes in step 202), the user apparatus UE reads p-Max2 from SIB1, and uses the value of p-Max2 as a maximum transmission value (Pemax).

By the way, to determine an NS value to be a valid value means that the user apparatus UE determines that the NS value corresponds to the transmission condition specified in the 3GPP standard for the band and the channel bandwidth used in the current cell and that the user apparatus UE can perform transmission operation under the transmission condition of the NS value.

On the other hand, in step 202, when the user apparatus UE does not support additionalSpectrumEmission2 (that is, the user apparatus UE cannot understand additionalSpectrumEmission2), the process goes to step 204.

The case where the user apparatus UE does not support additionalSpectrumEmission2 is a case in which the user apparatus UE cannot recognize the field, or a case where, although the user apparatus UE can read the value of the field, the user apparatus UE cannot recognize the value as a value corresponding to the band and the channel bandwidth used in the current cell.

In step 204, the user apparatus checks whether p-Max is broadcasted by SIB1. If it is broadcasted (Yes in step 204), the user apparatus UE uses the p-Max as a maximum transmission power in the cell (step 205). When p-Max is not broadcasted (No in step 204), the user apparatus UE uses a maximum transmission power according to the UE capability of the user apparatus UE (step 206).

(Change Examples of 3GPP Specification)

Next, description examples (excerpts) of a 3GPP specification (3GPP TS 36.331) that the communication system supporting operation described in the present embodiment should comply with are described as a form in which underlines are added to changed parts from the non-patent document 2.

FIG. 5A shows an excerpt of a SIB1 message (SystemInformationBlockType1 message). As shown in FIG. 5A, p-Max2 is added. The value of the p-Max2 is a value determined to be the maximum transmission power in step 203 of FIG. 4. The value of p-Max described in the upper part of FIG. 5A is a value to be regarded as the maximum transmission power in step 205 in FIG. 4.

As described in FIG. 5B, p-Max2 is a value applied to a user apparatus UE that supports additionalSpectrumEmission2 in the cell (the cell in which the SIB1 is broadcasted). In a case where p-Max2 does not exist, if p-Max is broadcasted, the user apparatus UE applies the p-Max, and if p-Max is not broadcasted, the user apparatus UE applies a maximum transmission power according to UE-capability.

FIG. 6A shows an excerpt of a SIB2 IE (SystemInformationBlockType2 information element). As shown in FIG. 6A, additionalSpectrumEmission2 is added. In step 202 of FIG. 4, when the UE can understand additionalSpectrumEmission2 (when the UE determines that it is a valid value), the UE uses p-Max2 as a maximum transmission power.

As described in FIG. 6B, the user apparatus UE that receives additionalSpectrumEmission2 of a value that is defined in table6.2.4-1 of TS36.101 as a valid value in the band and the bandwidth in the current cell applies the value of additionalSpectrumEmission2 instead of additionalSpectrumEmission. If the user apparatus UE that receives additionalSpectrumEmission2 of a value that is not defined in table6.2.4-1 of TS36.101 as a valid value in the band and the bandwidth in the current cell, the user apparatus UE disregards the field, and operates according to additionalSpectrumEmission.

By the way, in the present embodiment, the user apparatus UE can report, to the base station eNB, as a UE capability, whether the user apparatus UE has a capability for performing operation according to additionalSpectrumEmission2. FIG. 7A shows an excerpt of a UE capability IE (UE-EUTRA-Capability information element) corresponding to this operation. As shown in FIG. 7A, modifiedMPR-Behavior is added.

As described in FIG. 7B, in the field (bitmap), bit N is set to "1" if the user apparatus UE supports modified MPR/A-MPR behavior "N" specified in TS36.101. Absence of this field means that the user apparatus UE does not support any modified MPR/A-MPR behavior.

By adopting the above-mentioned scheme, even under a network where an NS value that the user apparatus UE cannot understand is broadcasted, it becomes possible to cause the user apparatus UE to connect to the network while suppressing the maximum transmission power. By the way, it is proposed to cause the user apparatus UE not to connect to the NW when the user apparatus UE cannot understand the NS value broadcasted by the base station eNB. However, it is more desirable to cause the user apparatus UE to connect to the network as described in the present embodiment than not to connect the network in terms of service providing.

Also, by adopting the scheme of the present embodiment, even though a new NS value/related A-MPR is specified when a new protection standard is provided, for example, it becomes possible, by properly defining parameters (p-Max, p-Max2, and the like) corresponding to these, to cause both of a UE that supports the new NS value and a UE that does not support it to reside in the cell and to perform transmission using a proper maximum transmission power. The same manner is applied to a case where new NS value/related A-MRP is defined for a specific channel bandwidth (example: A-MPR for 5 MHz is defined for NS_07 of band 13), or a case where additional NS value/A-MPR is defined, or a case where protection level is desired to be changed while diverting existing NS values, or the like.

As mentioned above, to transmit two NS values and two p-MAXes corresponding to the two NS values from the base station eNB to the user apparatus UE for a band is an example of transmitting a plurality of NS values and a plurality of p-MAXes. In the present embodiment, the base station eNB may transmit a number, equal to or greater than three, of NS values and the number of p-MAXes to the user apparatus UE.

For example, the base station eNB notifies the user apparatus UE of a list in which NS values are arranged in a decreasing order of priority by SIB2 (as described later, also SIB1 may be used), and also, the base station eNB may notify the user apparatus UE of a list of values of p-Maxes corresponding to each NS value in the list by SIB1. The user apparatus UE that receives these lists applies an NS value of the highest priority from among NS values that the user apparatus can apply in the notified NS values, so as to apply p-Max corresponding to the NS value.

As an example, in a case where the base station eNB transmits NS_50, NS_03, and NS_01 (in a descending order of priority) for a band that the user apparatus UE applies, the base station eNB transmits p-Max1, p-Max2 and p-Max3, by SIB1, as p-Maxes corresponding to NS_50, NS_03 and NS_01 respectively. Then, when the user apparatus UE applies NS_50, the user apparatus UE applies p-Max1 corresponding to NS_50. By the way, as to p-Max corresponding to an NS value (NS_01) of the lowest priority, the existing p-Max may be used without defining a new signaling.

Modified Example

In the examples so far, it was described that the user apparatus UE receives SIB1, SIB2 and the like in a cell where the user apparatus UE camped on by a procedure of cell selection/cell reselection to determine a maximum transmission power and the like of the cell based on information included in these.

In the communication system of the present embodiment (assuming LTE), as the cell reselection, there are same frequency cell reselection (intra-frequency cell reselection) and different frequency cell reselection (inter-frequency cell reselection).

In the same frequency cell reselection, when received power/reception quality of a reference signal in a cell (serving cell) where the user apparatus UE resides becomes equal to or less than a predetermined value, the user apparatus UE starts measurement of received power/reception quality in a neighboring cell of a frequency the same as the frequency (that may be referred to as carrier frequency) of the cell, so as to determine whether to transit to the neighboring cell based on the measurement result.

On the other hand, in the different frequency cell reselection, the user apparatus UE performs measurement of a neighboring cell of a frequency different from the frequency of the cell where the user apparatus UE resides based on priority and the like so as to determine whether to transit to the neighboring cell based on the measurement result. In the different frequency cell reselection, information included in SIB5 (System information Block Type 5) that is one of a plurality of types of system information transmitted from the base station eNB to the user apparatus UE (non-patent document 2) is used.

In the existing SIB5 described in the non-patent document 2, there is "InterFreqCarrierFreqInfo" for each frequency of neighboring cells. The "InterFreqCarrierFreqInfo" includes a frequency (a value of a field of dl-CarrierFreq), a maximum transmission power (a vale of a field of p-Max), a priority (a value of a field of cellReselectionPriority), various thresholds (values of fields of threshX-High, threshX-Low and the like).

The above-mentioned value of p-Max is one of parameters used in a determination condition for determining a transition destination cell (target cell).

However, in the conventional technique, since SIB5 does not include an NS value of the target cell. Thus, there is a possibility in that the above-mentioned p-Max is not an optimum value for selecting a target cell.

Thus, in this modified example, SIB5 includes, for each frequency of neighboring cells, a plurality of NS values and a value of P-Max corresponding to each of the plurality of NS values such that the user apparatus can properly determine a transition destination cell in different frequency cell reselection.

The plurality of NS values for each frequency are transmitted from the base station eNB to the user apparatus UE as a list in which the NS values are arranged in a decreasing order of priority, for example. Also, the plurality of p-Maxes corresponding to the plurality of NS values are notified as a list in which p-Maxes are arranged in the same order as the arranged order of NS values in the list of NS values. Also, an NS value and a value of p-Max corresponding to the NS value is set as a pair, so that a list in which the pairs are arranged in a descending order of priority may be included in SIB5, and transmitted from the base station eNB to the user apparatus UE.

As to the way for arranging the values in the list, descending order of priority is an example, and ascending order of priority may be used.

As an example, in a case where different frequencies notified by SIB5 are frequency 1 and frequency 2, "(NS value 1, P-Max1), (NS value 2, P-Max2), (NS value 3, P-Max3)" is included in SIB5 for the frequency 1 and "(NS value 1, P-Max1), (NS value 4, P-Max4), (NS value 5, P-Max5)" is included in SIB5 for the frequency 2. For example, "(NS value 1, P-Max1)" indicates that NS value 1 is associated with p-Max 1.

In different frequency cell reselection, in a case where the user apparatus UE that receives the above-mentioned list included in SIB5 determines whether to transit to a cell of "frequency 1", for example, the user apparatus UE refers to a list of NS values (or a list of pairs of NS values and p-Maxes) corresponding to "frequency 1", so as to select an NS value of the highest priority from among NS values that the user apparatus UE can apply in "frequency 1", and further, selects a p-Max corresponding to the NS value, then, performs determination by applying the selected p-Max.

For example, in a case where the list corresponding to the frequency 1 is "(NS value 1, P-Max1), (NS value 2, P-Max2), (NS value 3, P-Max3)", when the user apparatus UE supports NS value 2 and NS value 3, and when NS value 2 is higher than NS value 3 in priority, the user apparatus UE selects the NS value 2, and determines whether to transit to the cell of frequency 1 using P-Max2 corresponding to this.

When there is no p-Max corresponding to the selected NS value in SIB5, the user apparatus UE can apply p-Max in "InterFreqCarrierFreqInfo".

FIG. 8 and FIG. 9 show description examples (excerpts) of a 3GPP specification (3GPP TS 36.331) corresponding to the modified example of SIB5. In FIG. 8 and FIG. 9, portions changed from the non-patent document 2 are underlined.

FIG. 8 shows an excerpt of SIB5 (SystemInformationBlockType5 information element). As shown in FIG. 8, multiMPR-InfoList is added as a list of MPR-Info. The multiMPR-InfoList is included for each frequency of neighboring cells. As indicated by the description of FIG. 9, in this example, multiMPR-InfoList is a list in which pairs of additionalSpectrumEmission (NS value) and a value of p-Max corresponding to it are arranged in the order of priority. If p-Max is absent in MPR-Info, the user apparatus UE applies p-Max in InterFreqCarrierFreqInfo. Also, when the user apparatus UE does not support any additionalSpectrumEmission (NS value) in the list, the user apparatus UE applies p-Max in InterFreqCarrierFreqInfo.

Other description examples (excepts) of the 3GPP specification (3GPP TS 36.331) corresponding to the modified example on SIB5 are shown in FIG. 10 and FIG. 11. In FIG. 10 and FIG. 11, portions changed from the non-patent document 2 are underlined.

FIG. 10 shows an excerpt of SIB5 (SystemInformationBlockType5 information element). As shown in FIG. 10, additional-ns-values that is a list of P-maxNS-valueList is added. As shown in FIG. 11, the first P-maxNS-valueList includes a list of pairs of P-max and NS-value corresponding to freqBandIndicator in SIB1. The following P-maxNS-valueList corresponds to each additionalSpectrumEmission included in multiBandInfoList in SIB2.

Each P-maxNS-valueList is a list arranging pairs of additionalSpectrumEmission (NS value) and a value of p-Max corresponding to it in a descending order of priority. The user apparatus UE applies the first additionalSpectrumEmission (NS value) that the user apparatus UE supports in the list.

In the above-mentioned example, SIB5 that is used for different frequency cell reselection has been described. As to the same frequency cell reselection (intra-frequency cell re-selection), the value of p-Max used for determining whether to transit to a target cell is included in SIB3.

Like the case of SIB5, the existing SIB3 does not include an NS value of a target cell. Thus, there is a possibility in that the above-mentioned p-Max is not an optimum value for selecting a target cell.

Thus, in this modified example, SIB3 includes a plurality of NS values for transition destination cells (neighboring cells) and a value of P-Max corresponding to each of the plurality of NS values such that the user apparatus can properly determine a transition destination cell.

The plurality of NS values included in SIB3 are transmitted from the base station eNB to the user apparatus UE as a list in which the NS values are arranged in a decreasing order of priority, for example. Also, the plurality of p-Maxes corresponding to the plurality of NS values are notified as a list in which p-Maxes are arranged in the same order as the arranged order of NS values in the list of NS values. Also, an NS value and a value of p-Max corresponding to the NS value is set as a pair, so that a list in which the pairs are arranged in a descending order of priority may be included in SIB3, and transmitted from the base station eNB to the user apparatus UE.

As to the way for arranging the values in the list, descending order of priority is an example, and ascending order of priority may be used.

As an example, "(NS value 1, P-Max1), (NS value 2, P-Max2), (NS value 3, P-Max3)" is included in SIB3 as a list of pairs of NS value and p-Max that can be applied in a transition destination cell.

In same frequency cell reselection, in a case where the user apparatus UE that receives the above-mentioned list included in SIB3 determines whether to transit to another cell of the same frequency, the user apparatus UE refers to a list of NS values (or a list of pairs of NS values and p-Maxes) in SIB3, so as to select an NS value of the highest priority from among NS values that the user apparatus UE can apply, and further, selects a p-Max corresponding to the NS value, then, performs determination by applying the selected p-Max.

When there is no p-Max corresponding to the selected NS value in SIB3, the user apparatus UE can apply p-Max in "intraFreqCellReselectionInfo".

FIG. 12 and FIG. 13 show description examples (excerpts) of a 3GPP specification (3GPP TS 36.331) corresponding to the modified example on SIB3. In FIG. 12 and FIG. 13, portions changed from the non-patent document 2 are underlined.

FIG. 12 shows an excerpt of SIB3 (SystemInformationBlockType3 information element). As shown in FIG. 12, multiMPR-InfoList is added as a list of MPR-Info. As shown in FIG. 13, in this example, multiMPR-InfoList is a list in which pairs of additionalSpectrumEmission (NS value) and a value of p-Max corresponding to it are arranged in the order of priority. If p-Max is absent in MPR-Info, the user apparatus UE applies p-Max in intraFreqCellReselectionInfo. Also, when the user apparatus UE does not support any additionalSpectrumEmission (NS value) in the list, the user apparatus UE applies p-Max in intraFreqCellReselectionInfo.

Other description examples (excepts) of the 3GPP specification (3GPP TS 36.331) corresponding to the modified example on SIB3 are shown in FIG. 14 and FIG. 15. In FIG. 14 and FIG. 15, portions changed from the non-patent document 2 are underlined.

FIG. 14 shows an excerpt of SIB3 (SystemInformationBlockType3 information element). As shown in FIG. 14, additional-ns-values that is a list of P-maxNS-valueList is added. As shown in FIG. 15, the first P-maxNS-valueList includes a list of pairs of P-max and NS-value corresponding to freqBandIndicator in SIB1. The following P-maxNS-valueList corresponds to each additionalSpectrumEmission included in multiBandInfoList in SIB2.

Each P-maxNS-valueList is a list arranging pairs of additionalSpectrumEmission (NS value) and a value of p-Max corresponding to it in a descending order of priority. The user apparatus UE applies the first additionalSpectrumEmission (NS value) that the user apparatus UE supports in the list.

In the same way as the above-mentioned SIB5 and SIB3, it is also possible that the base station eNB transmits a plurality of NS value and a plurality of p-Max values together by using SIB1 (or SIB2). That is, in the before-mentioned embodiment, an example has been described in which a plurality of NS values are transmitted by SIB2, and a plurality of p-Max values are transmitted by SIB1. On the other hand, in the modified example, a plurality of NS values are transmitted together with a plurality of p-Max values using SIB1 or SIB2.

The plurality of NS values are included in SIB1 or SIB2 as a list in which the NS values are arranged in a decreasing order of priority, for example. Also, the plurality of p-Maxes corresponding to the plurality of NS values are included in SIB1 or SIB2 as a list in which p-Maxes are arranged in the same order as the arranged order of NS values in the list of NS values. Also, an NS value and a value of p-Max corresponding to the NS value is set as a pair, so that a list in which the pairs are arranged in a descending order of priority may be included in SIB1 or SIB2, and transmitted from the base station eNB to the user apparatus UE.

As to the way for arranging the values in the list, descending order of priority is an example, and ascending order of priority may be used.

As an example, "(NS value 1, P-Max1), (NS value 2, P-Max2), (NS value 3, P-Max3)" is included for a band in SIB1 or SIB2. For example, "(NS value 1, P-Max1)" indicates that NS value 1 is associated with p-Max 1.

In a case where the user apparatus UE that receives the above-mentioned list included in SIB1 or SIB2 applies the band in the cell, the user apparatus UE refers to a list of NS values (or a list of pairs of NS values and p-Maxes) corresponding to the band, so as to select an NS value of the highest priority from among NS values that the user apparatus UE can apply in the band, and further, selects a p-Max corresponding to the NS value, then, performs transmission control by applying the selected p-Max.

For example, in a case where the list corresponding to the band that the user apparatus UE applies is "(NS value 1, P-Max1), (NS value 2, P-Max2), (NS value 3, P-Max3)", when the user apparatus UE supports NS value 2 and NS value 3, and when NS value 2 is higher than NS value 3 in priority, the user apparatus UE selects the NS value 2, and performs control of a maximum transmission power using the NS value 2 and P-Max2 corresponding to this.

When there is no p-Max corresponding to the selected NS value in SIB1 (or SIB2), the user apparatus UE can apply an existing p-Max included in SIB1.

FIG. 16 shows a description example (excerpts) of a 3GPP specification (3GPP TS 36.331) corresponding to the modified example on SIB1. In FIG. 16, portions changed from the non-patent document 2 are underlined.

FIG. 16 shows an excerpt of SIB1 (SystemInformationBlockType1 information element). As shown in FIG. 16, multiMPR-InfoList is added as a list of MPR-Info. In this example, multiMPR-InfoList is a list in which pairs of additionalSpectrumEmission (NS value) and a value of p-Max corresponding to it are arranged in the order of priority. If p-Max is absent in MPR-Info, the user apparatus UE applies the existing p-Max. Also, when the user apparatus UE does not support any additionalSpectrumEmission (NS value) in the list, the user apparatus UE applies the existing p-Max.

The user apparatus UE can also perform cell selection using p-Max corresponding to the NS value selected from the plurality of NS values transmitted by SIB1.

Other description examples (excepts) of the 3GPP specification (3GPP TS 36.331) corresponding to the modified example on SIB1 are shown in FIG. 17 and FIG. 18. In FIG. 17 and FIG. 18, portions changed from the non-patent document 2 are underlined.

FIG. 17 shows an excerpt of SIB1 (SystemInformationBlockType1 information element). As shown in FIG. 17, additional-ns-values that is a list of P-maxNS-valueList is added. As shown in FIG. 18, the first P-maxNS-valueList includes a list of pairs of P-max and NS-value corresponding to freqBandIndicator in SIB1. The following P-maxNS-valueList corresponds to each additionalSpectrumEmission included in multiBandInfoList in SIB2.

Each P-maxNS-valueList is a list arranging pairs of additionalSpectrumEmission (NS value) and a value of p-Max corresponding to it in a descending order of priority. The user apparatus UE applies the first additionalSpectrumEmission (NS value) that the user apparatus UE supports in the list.

Description examples (excepts) of the 3GPP specification (3GPP TS 36.331) corresponding to the modified example on SIB2 are shown in FIG. 19 and FIG. 20. In FIG. 19 and FIG. 20, portions changed from the non-patent document 2 are underlined.

FIG. 19 shows an excerpt of SIB2 (SystemInformationBlockType2 information element). As shown in FIG. 19, additional-ns-values that is a list of P-maxNS-valueList is added. As shown in FIG. 20, the first P-maxNS-valueList includes a list of pairs of P-max and NS-value corresponding to freqBandIndicator in SIB1. The following P-maxNS-valueList corresponds to each additionalSpectrumEmission included in multiBandInfoList in SIB2.

Each P-maxNS-valueList is a list arranging pairs of additionalSpectrumEmission (NS value) and a value of p-Max corresponding to it in a descending order of priority. The user apparatus UE applies the first additionalSpectrumEmission (NS value) that the user apparatus UE supports in the list.

(Apparatus Configuration)

Next, configuration examples of the user apparatus UE and the base station eNB in the embodiment (including modified example) of the present invention are shown.

<User Apparatus UE>

Figure 21:
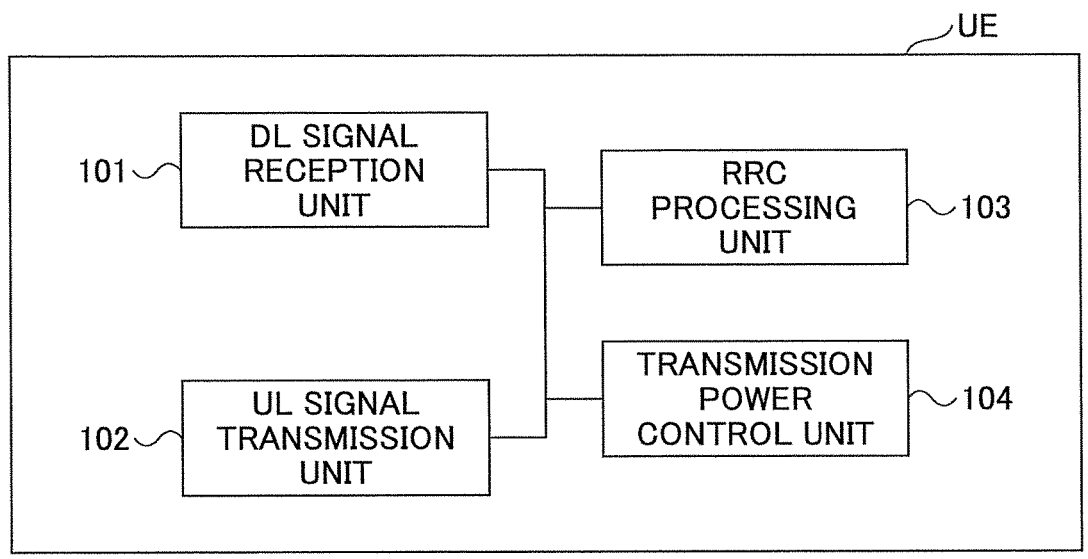
FIG. 21 is a block diagram of a user apparatus UE.

FIG. 21 shows a functional block diagram of the user apparatus UE. As shown in FIG. 21, the user apparatus UE includes a DL signal reception unit 101, an UL signal transmission unit 102, an RRC processing unit 103, a transmission power control unit 104. FIG. 21 shows only functional units especially related to the embodiment of the present invention in the user apparatus UE, and the user apparatus UE includes functions not shown in the figure for at least performing operation complying with LTE.

The DL signal reception unit 101 includes functions configured to receive various downlink signals from the base station eNB, and obtain information of an upper layer from the received physical layer signals. The UL signal transmission unit 102 includes functions configured to generate various signals of physical layer from information of an upper layer that should be transmitted from the user apparatus UE so as to transmit the signals to the base station eNB. Also, the DL signal reception unit 101 includes a function configured to execute cell selection and cell reselection. That is, the DL signal reception unit 101 includes a control unit configured to select a signaling value from among a plurality of signaling values included in system information, and to perform cell selection or cell reselection using a maximum transmission power corresponding to the signaling value. The control unit may be provided outside the DL signal reception unit 101.

The RRC processing unit 103 performs reception and reading of SIB1, SIB2, SIB3, SIB5 and the like described in the present embodiment, and performs processing described with reference to FIG. 4, and processing for determining an NS value and a p-Max in the modified example, or the like. The transmission power control unit 104 performs control of transmission power, and the like, based on received additionalSpectrumEmission/additionalSpectrumEmission2 and the like and determined maximum transmission power (p-Max/p-Max2 and the like).

The configuration of the user apparatus UE shown in FIG. 21 may be realized by hardware circuits (example: one or a plurality of IC chips) as a whole, or may be realized by hardware circuits for a part and by a CPU and a program for other parts.

Figure 22:
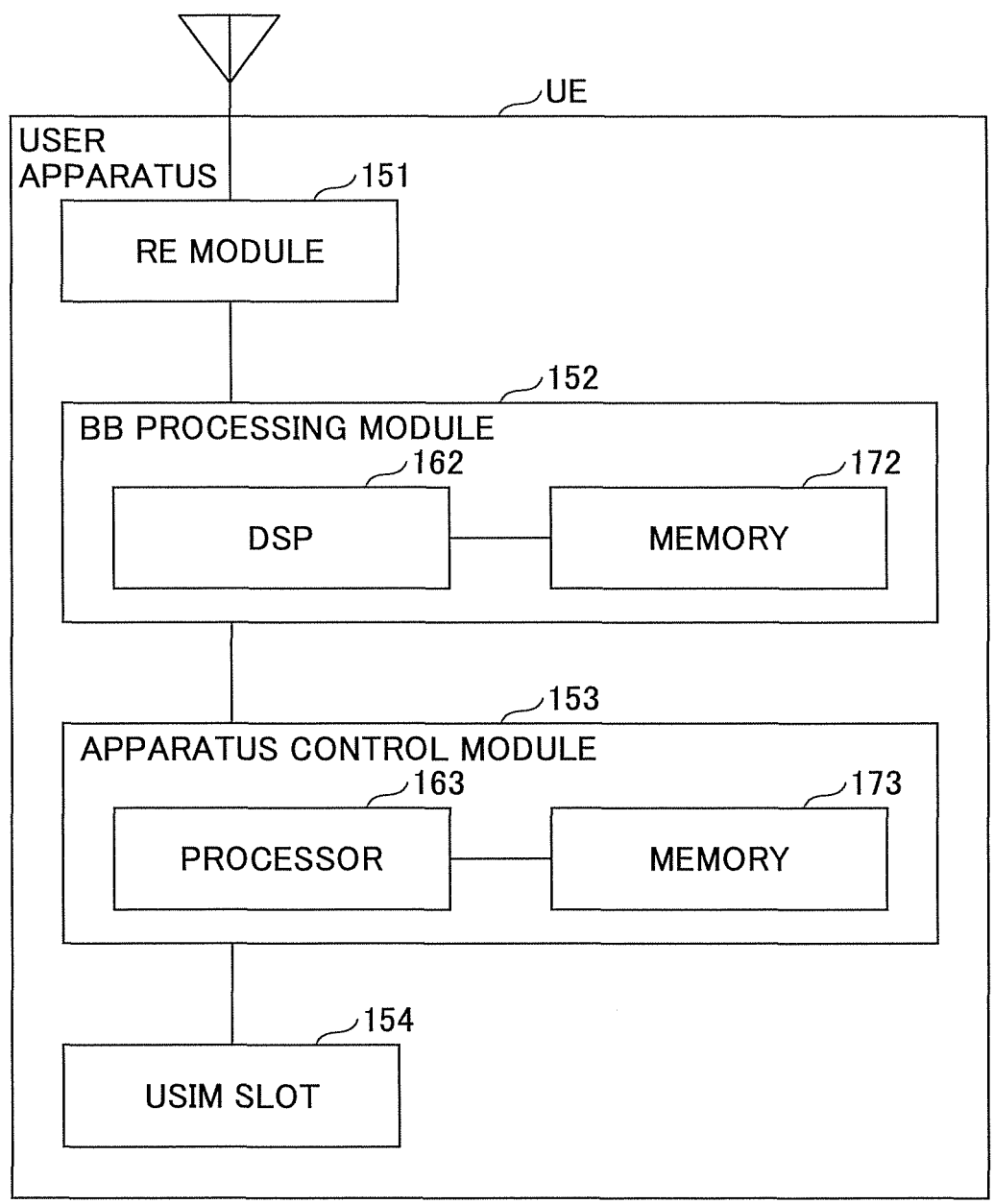
FIG. 22 is a HW block diagram of a user apparatus UE.

FIG. 22 is a diagram showing an example of a hardware (HW) configuration of the user apparatus UE. FIG. 22 shows a configuration closer to an implementation example than FIG. 21. As shown in FIG. 22, the UE includes an RE (Radio Equipment) module 151 for performing processing on radio signals, a BB (Base Band) processing module 152 for performing baseband signal processing, an apparatus control module 153 for performing processes of upper layer and the like, and a USIM slot 154 that is an interface for accessing a USIM card.

The RE module 151 generates a radio signal that should be transmitted from an antenna by performing D/A (Digital-to-Analog) conversion, modulation, frequency conversion, and power amplifying and the like on a digital baseband signal received from the BB processing module 152. Also, the RE module 151 generates a digital baseband signal by performing frequency conversion, A/D (Analog to Digital) conversion, demodulation and the like on a received radio signal, so as to pass the signal to the BB processing module 152. The RE module 151 includes, for example, functions of physical layer and the like of the DL signal reception unit 101 and the UL signal transmission unit 102 of FIG. 21.

The BB processing module 152 performs processing for converting between IP packets and digital baseband signals. The DSP (Digital Signal Processor) 162 is a processor for performing signal processing in the BB processing module 152. The memory 172 is used as a work area of the DSP 162. The BB processing module 152 may include, for example, functions of layer 2 and the like of the DL signal reception unit 101 and the UL signal transmission unit 102, the RRC processing unit 103 and the transmission power control unit 104. All of or a part of functions of the RRC processing unit 103 and the transmission power control unit 104 may be included in the apparatus control module 153.

The apparatus control module 153 performs protocol processing of IP layer, processing of various applications, and the like. The processor 163 is a processor for performing processes performed by the apparatus control module 153. The memory 173 is used as a work area of the processor 163. The processor 163 performs read and write of data with a USIM via the USIM slot 154.

<Base Station eNB>

Figure 23:
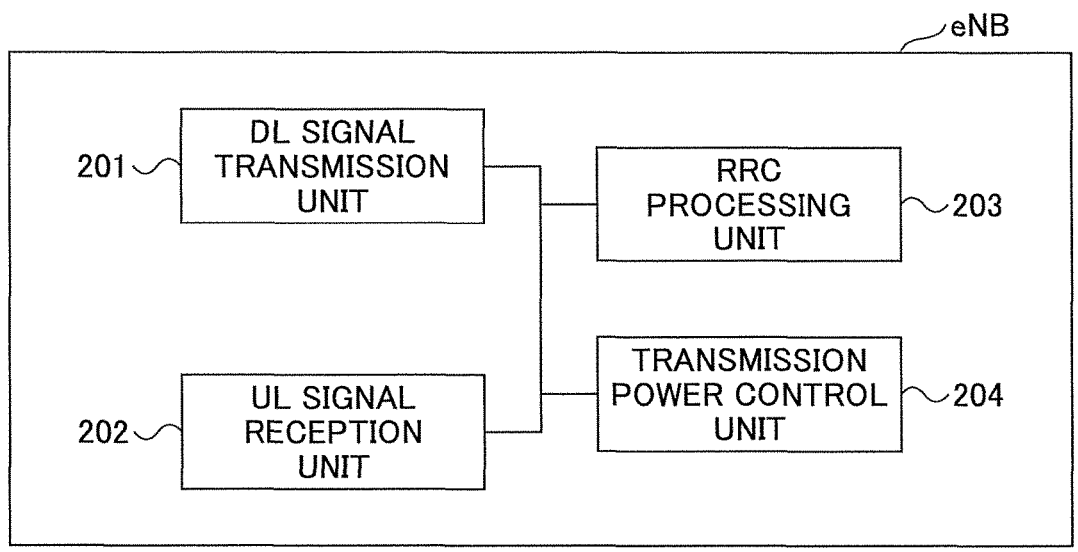
FIG. 23 is a block diagram of a base station eNB.

FIG. 23 shows a functional block diagram of a base station eNB. As shown in FIG. 23, the base station eNB includes a DL signal transmission unit 201, an UL signal reception unit 202, an RRC processing unit 203 and a transmission power control unit 204. FIG. 23 shows only functional units especially related to the embodiment of the present invention in the base station eNB, and the base station eNB includes functions not shown in the figure for at least performing operation complying with LTE.

The DL signal transmission unit 201 includes functions configured to generate various signals of physical layer from information of an upper layer that should be transmitted from the base station eNB so as to transmit the signals. The UL signal reception unit 202 includes functions configured to receive various uplink signals from the user apparatus UE, and obtain information of an upper layer from the received physical layer signals.

The RRC processing unit 203 performs generation and transmission of SIB1, SIB2, SIB3, SIB5 and the like described in the present embodiment. Also, the RRC processing unit 203 includes functions for receiving UE capability information from the user apparatus UE to hold it. The transmission power control unit 204 performs, for example, scheduling, UL power control and the like for the user apparatus UE in consideration of the maximum transmission power of the user apparatus UE.

The configuration of the base station eNB shown in FIG. 23 may be realized by hardware circuits (example: one or a plurality of IC chips) as a whole, or may be realized by hardware circuits for a part and by a CPU and a program for other parts.

Figure 24:
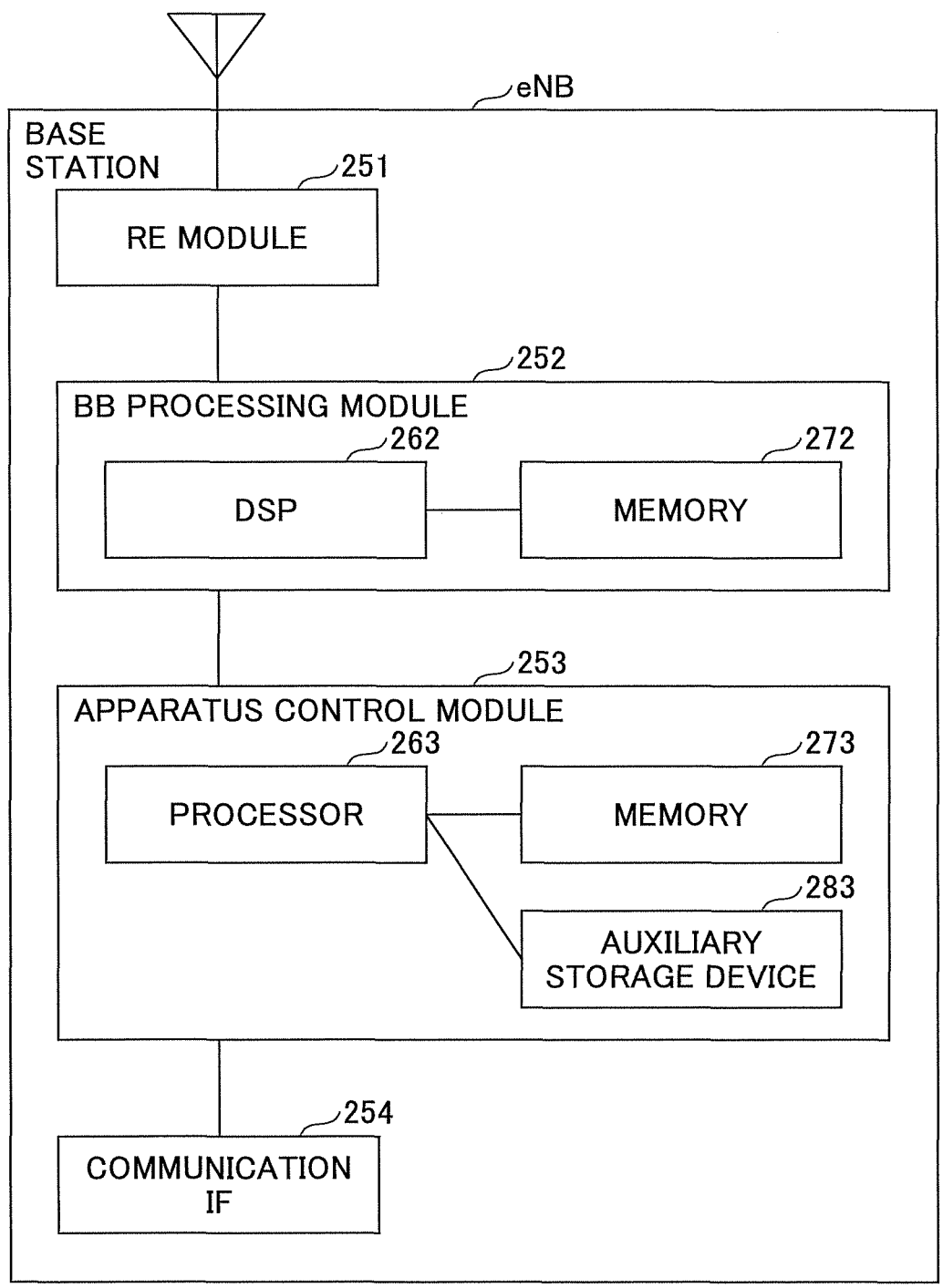
FIG. 24 is a block diagram of a base station eNB.

FIG. 24 is a diagram showing an example of a hardware (HW) configuration of the base station eNB. FIG. 24 shows a configuration closer to an implementation example than FIG. 23. As shown in FIG. 24, the base station eNB includes an RE module 251 for performing processing on radio signals, a BB processing module 252 for performing baseband signal processing, an apparatus control module 253 for performing processes of upper layer and the like, and a communication IF 254 that is an interface for connecting to a network.

The RE module 251 generates a radio signal that should be transmitted from an antenna by performing D/A conversion, modulation, frequency conversion, and power amplifying and the like on a digital baseband signal received form the BB processing module 252. Also, the RE module 251 generates a digital baseband signal by performing frequency conversion, A/D conversion, demodulation and the like on a received radio signal, so as to pass the signal to the BB processing module 252. The RE module 251 includes, for example, functions of physical layer and the like of the DL signal transmission unit 201 and the UL signal reception unit 202.

The BB processing module 252 performs processing for converting between IP packets and digital baseband signals. The DSP 262 is a processor for performing signal processing in the BB processing module 252. The memory 272 is used as a work area of the DSP 262. The BB processing module 252 may include, for example, functions of layer 2 and the like of the DL signal transmission unit 201 and the UL signal reception unit 202, the RRC processing unit 203 and the transmission power control unit 204. All of or a part of functions of the RRC processing unit 203 and the transmission power control unit 204 may be included in the apparatus control module 253.

The apparatus control module 253 performs protocol processing of IP layer, OAM processing, and the like. The processor 263 is a processor for performing processes performed by the apparatus control module 253. The memory 273 is used as a work area of the processor 263. The auxiliary storage device 283 is, for example, an HDD and the like, and stores various setting information and the like for operation of the base station eNB.

The configuration (functional divisions) of the apparatuses shown in FIGS. 21-24 is mere an example. The implementation method (concrete arrangement of functional units and the like) is not limited to a specific implementation method as long as processes described in the present embodiment can be realized.

As described above, according to the present embodiment, there is provided a user apparatus in a mobile communication system including a base station and a user apparatus, including:

reception means configured to receive, from the base station, first system information including a first maximum transmission power value and a second maximum transmission power value, and second system information including a first signaling value and a second signaling value; and control means configured, when determining that the second signaling value included in the second system information is a value defined as a transmission condition in a cell where the user apparatus resides, to determine the second maximum transmission power value corresponding to the second signaling value as a maximum transmission power value for use in the cell.

According to the above configuration, for example, there is provided a technique, in a cell where system information on a new transmission condition is broadcasted, for enabling not only a user apparatus that can understand the new transmission condition but also a user apparatus that cannot understand the new transmission condition to perform transmission by using a proper maximum transmission power.

For example, when the control means does not determine that the second signaling value included in the second system information is a value defined as a transmission condition in a cell where the user apparatus resides, the control means determines the first maximum transmission power value as a maximum transmission power value for use in the cell. According to this configuration, for example, even when the user apparatus cannot interpret the second signaling value on a new transmission condition, the user apparatus can properly determine a maximum transmission power value so as to be able to camp on the cell and to perform communication.

For example, when the user apparatus does not receive the first maximum transmission power value from the base station, the user apparatus may determine a maximum transmission power value according to the capability of the user apparatus as a maximum transmission power value for use in the cell. According to this configuration, even when the user apparatus cannot interpret the second signaling value on a new transmission condition and does not receive the first maximum transmission power value, the user apparatus can properly determine a maximum transmission power value so as to be able to camp on the cell and to perform communication.

The transmission condition is a condition including availability of application of A-MPR, for example. According to this configuration, for example, it becomes possible to cause the user apparatus to operate by complying with a transmission condition (example: a table where a new NS is added to Table 6.2.4-1 of non-patent document 1) that is considered to be defined in 3GPP TS36.101. For example, the first system information is SIB1 and the second system information is SIB1 or SIB2. According to this configuration, the user apparatus can properly receive a signaling value.

The control means may select a signaling value of a highest priority, from among signaling values that the user apparatus can apply in the plurality of signaling values included in the second system information, as the second signaling value, and determine the second maximum transmission power value corresponding to the second signaling value as a maximum transmission power value for use in the cell. According to this configuration, a proper signaling value can be selected from among a plurality of signaling values.

Also, according to the preset embodiment, there is provided a user apparatus in a mobile communication system including a base station and the user apparatus, including:

reception means configured to receive, from the base station, system information that includes a plurality of signaling values and a plurality of maximum transmission power values that correspond to the plurality of signaling values respectively; and control means configured to select one signaling value from among the plurality of signaling values included in the system information, and to execute cell selection or cell reselection using a maximum transmission power corresponding to the one signaling value.

Also, according to the preset embodiment, there is provided a user apparatus in a mobile communication system including a base station and the user apparatus, including:

reception means configured to receive, from the base station, system information that includes a plurality of signaling values and a plurality of maximum transmission power values that correspond to the plurality of signaling values respectively; and control means configured to select one signaling value, of the highest priority, that the user apparatus can apply, from among the plurality of signaling values included in the system information, and to perform transmission using a maximum transmission power corresponding to the one signaling value.

According to the above-mentioned configuration, there is provided a technique, in a cell where system information on a new transmission condition is broadcasted, for enabling not only a user apparatus that can understand the new transmission condition but also a user apparatus that cannot understand the new transmission condition to perform transmission by using a proper maximum transmission power.

Also, according to the above-mentioned configuration, in a case where there is a cell, as a neighboring cell, where system information on a new transmission condition is broadcasted, not only a user apparatus that can understand the new transmission condition but also a user apparatus that cannot understand the new transmission condition can perform cell reselection by applying a proper maximum transmission power. As a result, it becomes possible to perform transmission in a transition destination cell by using a proper maximum transmission power.

Also, according to the preset embodiment, there is provided a mobile communication system including a base station and a user apparatus, the base station including:

transmission means configured to transmit first system information including a first maximum transmission power value and a second maximum transmission power value, and second system information including a first signaling value and a second signaling value, the user apparatus including:

reception means configured to receive the first system information and the second system information from the base station; and control means configured, when determining that the second signaling value included in the second system information is a value defined as a transmission condition in a cell where the user apparatus resides, to determine the second maximum transmission power value corresponding to the second signaling value as a maximum transmission power value for use in the cell.

According to the above configuration, for example, there is provided a technique, in a cell where system information on a new transmission condition is broadcasted, for enabling not only a user apparatus that can understand the new transmission condition but also a user apparatus that cannot understand the new transmission condition to perform transmission by using a proper maximum transmission power.

The user apparatus UE described in the present embodiment may include a CPU and a memory and may be realized by executing a program by the CPU (processor), or may be realized by hardware such as hardware circuits including logics of processing described in the present embodiment, or may be configured by coexistence of a program and hardware.

The base station eNB described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, the embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the base station eNB have been explained by using functional block diagrams. However, such an apparatus may be implemented in hardware, software, or a combination thereof.

Each of the software executed by a processor provided in the user apparatus UE according to an embodiment of the present invention and the software executed by a processor provided in the base station may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2014-206231, filed in the JPO on Oct. 7, 2014 and Japanese patent application No. 2015-109145, filed in the JPO on May 28, 2015, and the entire contents of the Japanese patent application No. 2014-206231 and the Japanese patent application No. 2015-109145 are incorporated herein by reference.

DESCRIPTION OF REFERENCE SIGNS eNB base station
UE user apparatus
101 DL signal reception unit
102 UL signal transmission unit
103 RRC processing unit
104 transmission power control unit
151 RE module
152 BB processing module
153 apparatus control module
154 USIM slot
201 DL signal transmission unit
202 UL signal reception unit
203 RRC processing unit
204 transmission power control unit
251 RE module
252 BB processing module
253 apparatus control module
254 communication IF

The invention claimed is:

1. A user apparatus in a mobile communication system including a base station and the user apparatus, the user apparatus comprising:
a reception circuit configured to receive, from the base station, a single type of system information comprising: a first maximum transmission power value, a second maximum transmission power value, a first signaling value, and a second signaling value; and
a control circuit configured, when the user apparatus supports the second signaling value included in the single type of system information, to determine the second maximum transmission power value corresponding to the second signaling value as a maximum transmission power value for use in a cell where the user apparatus resides.

2. The user apparatus as claimed in claim 1, wherein, when the user apparatus does not support the second signaling value included in the single type of system information, the control circuit determines the first maximum transmission power value as the maximum transmission power value for use in the cell.

3. The user apparatus as claimed in claim 2, wherein the single type of system information is SIB1.

4. The user apparatus as claimed in claim 2, wherein the control circuit selects a signaling value of a highest priority, from signaling values that the user apparatus supports and are included in the single type of system information, as the second signaling value, and determines the second maximum transmission power value corresponding to the second signaling value as the maximum transmission power value for use in the cell.

5. The user apparatus as claimed in claim 1, wherein the single type of system information is System Information Block type 1 (SIB1).

6. The user apparatus as claimed in claim 5, wherein the control circuit selects a signaling value of a highest priority, from signaling values that the user apparatus supports and are included in the single type of system information, as the second signaling value, and determines the second maximum transmission power value corresponding to the second signaling value as the maximum transmission power value for use in the cell.

7. The user apparatus as claimed in claim 1, wherein the control circuit selects a signaling value of a highest priority, from signaling values that the user apparatus supports and are included in the single type of system information, as the second signaling value, and determines the second maximum transmission power value corresponding to the second signaling value as the maximum transmission power value for use in the cell.

8. A user apparatus in a mobile communication system including a base station and the user apparatus, the user apparatus comprising:
a reception circuit configured to receive, from the base station, a single type of system information comprising: a plurality of signaling values and a plurality of maximum transmission power values that correspond to the plurality of signaling values; and
a control circuit configured to select one signaling value from the plurality of signaling values included in the single type of system information, and to execute cell selection or cell reselection using a maximum transmission power corresponding to the one signaling value.

9. A mobile communication system including a base station and a user apparatus, the base station comprising:
a transmission circuit configured to transmit a single type of system information comprising: a first maximum transmission power value, a second maximum transmission power value, a first signaling value, and a second signaling value, and the user apparatus comprising:
a reception circuit configured to receive the single type of system information; and
a control circuit configured, when the user apparatus supports the second signaling value included in the single type of system information, to determine the second maximum transmission power value corresponding to the second signaling value as a maximum transmission power value for use in a cell where the user apparatus resides.

10. A maximum transmission power determination method executed by a user apparatus in a mobile communication system including a base station and the user apparatus, the method comprising:

receiving, from the base station, a single type of system information comprising: a first maximum transmission power value, a second maximum transmission power value, a first signaling value, and a second signaling value; and determining, when the user apparatus supports the second signaling value included in the single type of system information, the second maximum transmission power value corresponding to the second signaling value as a maximum transmission power value for use in a cell where the user apparatus resides.

11. A maximum transmission power determination method executed by a mobile communication system including a base station and a user apparatus, the method comprising:

transmitting, by the base station, a single type of system information comprising: a first maximum transmission power value, a second maximum transmission power value, a first signaling value, and a second signaling value, receiving, by the user apparatus, the single type of system information; and determining by the user apparatus, when the user apparatus supports the second signaling value included in the single type of system information, the second maximum transmission power value corresponding to the second signaling value as a maximum transmission power value for use in a cell where the user apparatus resides.

* * * * *